US011952795B2

(12) United States Patent
Fisher et al.

(10) Patent No.: US 11,952,795 B2
(45) **Date of Patent: *Apr. 9, 2024**

(54) BOLLARD SETTING AND INSTALLATION SYSTEM

(71) Applicant: TGR Construction, Inc., Tempe, AZ (US)

(72) Inventors: Thomas G. Fisher, Dickinson, ND (US); Gregory L. Schafer, Dickinson, ND (US)

(73) Assignee: TGR Construction, Inc., Tempe, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/353,456

(22) Filed: Jul. 17, 2023

(65) Prior Publication Data

US 2023/0358074 A1 Nov. 9, 2023

Related U.S. Application Data

(63) Continuation of application No. 17/460,477, filed on Aug. 30, 2021, now Pat. No. 11,708,705, which is a (Continued)

(51) Int. Cl.
*E04H 17/26* (2006.01)
*B66C 1/42* (2006.01)

(52) U.S. Cl.
CPC ............. *E04H 17/263* (2013.01); *B66C 1/42* (2013.01)

(58) Field of Classification Search
CPC ....... E04H 17/263; E04H 17/261; B66C 1/42; B66C 1/44; B66C 1/105; B66C 1/36;
(Continued)

(56) References Cited

U.S. PATENT DOCUMENTS

| | | |
|---|---|---|
| 1,629,899 A | 5/1927 | Wustholz |
| 1,721,816 A | 7/1929 | Glazer |

(Continued)

FOREIGN PATENT DOCUMENTS

| | | |
|---|---|---|
| DE | 2657111 A1 | 6/1977 |
| DE | 29915801 U1 | 10/2000 |

(Continued)

OTHER PUBLICATIONS http://www.aluminumconcreteforms.com/crane_set_concrete_forms.htm; Wall-Ties & Forms Concrete Big Panel Concrete Forms Website Page.

(Continued)

*Primary Examiner* — Glenn F Myers
(74) *Attorney, Agent, or Firm* — Neustel Law Offices

(57) ABSTRACT

A bollard setting and installation system for efficiently installing a bollard wall without any restrictions relating to proximity to water or flood plains. The bollard setting and installation system generally includes a setting frame which is positioned on a ground surface. A plurality of bollards is positioned on the setting frame in a desired spacing and orientation to form a bollard wall. A vehicle having a vehicle arm connected to a lifting frame is positioned such that the bollards are secured to the lifting frame by clamps in the desired spacing and orientation. The vehicle may then move the lifting frame to position the lower ends of the bollards in an opening in the ground surface. Concrete may be poured to encapsulate the lower ends of the bollards. The lifting frame may then be removed, with the bollard wall being free-standing in the ground surface.

20 Claims, 18 Drawing Sheets

Related U.S. Application Data continuation of application No. 16/858,523, filed on Apr. 24, 2020, now Pat. No. 11,105,117, which is a continuation of application No. 16/555,537, filed on Aug. 29, 2019, now Pat. No. 10,633,887.

(58) Field of Classification Search
CPC ....... B66C 1/64; E04G 21/165; E04G 21/168; E04G 21/167; B66F 9/18; B66F 9/183; B66F 9/185; E04B 1/35; E04B 2001/3588
See application file for complete search history.

(56) References Cited

U.S. PATENT DOCUMENTS

| | | | |
|---|---|---|---|
| 1,925,689 | A | 9/1933 | Dietrich |
| 2,049,916 | A | 8/1936 | Lingle |
| 2,164,592 | A | 7/1939 | Pilj |
| 2,172,461 | A | 9/1939 | Whitescarver |
| 2,173,698 | A | 9/1939 | Schenk |
| 2,395,204 | A | 2/1946 | Symons |
| 2,497,887 | A | 2/1950 | Hilpert |
| 2,528,783 | A | 11/1950 | Reinhart |
| 2,614,801 | A | 10/1952 | Mazzei |
| 2,659,125 | A | 11/1953 | Williams |
| 2,717,801 | A | 9/1955 | Neil |
| 2,902,311 | A | 9/1959 | Reel |
| 3,163,904 | A | 1/1965 | Ziolkowski |
| 3,209,933 | A | 10/1965 | Barnes |
| 3,220,760 | A | 11/1965 | Buchik |
| 3,298,541 | A | 1/1967 | Alexon |
| 3,432,041 | A | 3/1969 | van Huet |
| 3,464,667 | A | 9/1969 | Sledz |
| 3,478,396 | A | 11/1969 | Drouillard |
| 3,635,613 | A | 1/1972 | Marsh |
| 3,676,031 | A | 7/1972 | Stinton |
| 3,687,597 | A | 8/1972 | Lavergne, Jr. |
| 3,693,931 | A | 9/1972 | Holt |
| 3,760,966 | A | 9/1973 | Jones, Jr. |
| 3,801,061 | A | 4/1974 | Holt |
| 3,833,706 | A | 9/1974 | Edwards |
| 3,844,697 | A | 10/1974 | Edwards |
| 3,910,546 | A | 10/1975 | Connors |
| 3,926,318 | A | 12/1975 | Kister |
| 3,954,189 | A | 5/1976 | Sherritt |
| 3,965,542 | A | 6/1976 | Gregory |
| 4,003,543 | A | 1/1977 | Doubleday |
| 4,006,878 | A | 2/1977 | Dawson |
| 4,023,771 | A | 5/1977 | Walchek |
| 4,044,986 | A | 8/1977 | Strickland |
| 4,098,045 | A | 7/1978 | Astor |
| 4,158,452 | A | 6/1979 | Gates |
| 4,186,906 | A | 2/1980 | Koga |
| 4,192,481 | A | 3/1980 | Durbin |
| 4,218,039 | A | 8/1980 | Gates |
| 4,221,357 | A | 9/1980 | Bowden |
| 4,231,541 | A | 11/1980 | Strickland |
| 4,254,932 | A | 3/1981 | Durbin |
| 4,290,246 | A | 9/1981 | Hilsey |
| 4,314,775 | A | 2/1982 | Johnson |
| 4,384,739 | A | 5/1983 | Gustavsson |
| 4,405,262 | A | 9/1983 | Nagashima |
| 4,417,425 | A | 11/1983 | Case |
| 4,441,685 | A | 4/1984 | Greeson |
| 4,481,743 | A | 11/1984 | Jellen |
| 4,611,784 | A | 9/1986 | Gallis |
| 4,671,724 | A | 6/1987 | Bolton |
| 4,676,713 | A | 6/1987 | Voelpel |
| 4,700,979 | A | 10/1987 | Courtois |
| 4,708,315 | A | 11/1987 | Carlson |
| 4,726,562 | A | 2/1988 | Courtois |
| 4,795,136 | A | 1/1989 | Haefner |
| 4,807,843 | A | 2/1989 | Courtois |
| 4,812,113 | A | 3/1989 | Jantzen |
| 4,846,433 | A | 7/1989 | Courtois |
| 4,899,978 | A | 2/1990 | Gates |
| 4,924,641 | A | 5/1990 | Gibbar, Jr. |
| 4,927,317 | A | 5/1990 | Acosta |
| 5,038,541 | A | 8/1991 | Gibbar, Jr. |
| 5,050,365 | A | 9/1991 | Edgar |
| 5,073,077 | A | 12/1991 | Attman |
| RE33,881 | E | 4/1992 | Courtois |
| 5,114,294 | A | 5/1992 | Attman |
| 5,127,791 | A | 7/1992 | Attman |
| 5,224,808 | A | 7/1993 | Macris |
| 5,351,456 | A | 10/1994 | Paine, Jr. |
| 5,364,050 | A | 11/1994 | Smith |
| 5,425,213 | A | 6/1995 | Abe |
| 5,441,379 | A | 8/1995 | Gilbert, Jr. |
| 5,537,797 | A | 7/1996 | Harkenrider |
| 5,624,222 | A | 4/1997 | Hiatt |
| 5,643,488 | A | 7/1997 | Lee |
| 5,799,399 | A | 9/1998 | Schultz |
| 5,857,296 | A | 1/1999 | Niday |
| 5,922,236 | A | 7/1999 | Zuhl |
| 5,956,922 | A | 9/1999 | Liuska |
| 6,513,785 | B1 | 2/2003 | Worley |
| 6,523,323 | B2 | 2/2003 | Worley |
| 6,729,079 | B2 | 5/2004 | Francies, III |
| 6,755,385 | B2 | 6/2004 | Lancelot, III |
| 6,935,607 | B2 | 8/2005 | Ward |
| 7,004,443 | B2 | 2/2006 | Bennett |
| 7,051,988 | B2 | 5/2006 | Shaw |
| 7,144,186 | B1 | 12/2006 | Nolte |
| 7,222,460 | B2 | 5/2007 | Francies, III |
| 7,775,500 | B1 | 8/2010 | Vegsund |
| 7,819,388 | B2 | 10/2010 | McCallion |
| 7,828,263 | B2 | 11/2010 | Bennett |
| 7,874,053 | B2 | 1/2011 | Stangel |
| 8,186,645 | B2 | 5/2012 | Shaw |
| 8,317,502 | B1 | 11/2012 | Grey |
| 8,464,996 | B2 | 6/2013 | Spindler |
| 9,033,619 | B2 | 5/2015 | Riggle, Jr. |
| 9,212,462 | B2 | 12/2015 | Borel |
| 9,297,179 | B2 | 3/2016 | Smith |
| 9,347,231 | B2 | 5/2016 | Cormier |
| 9,988,823 | B1 | 6/2018 | Fisher |
| 10,427,916 | B1 | 10/2019 | Fisher |
| 2003/0057747 | A1 | 3/2003 | Johnston |
| 2004/0218997 | A1 | 11/2004 | Neubauer |
| 2005/0218291 | A1 | 10/2005 | Musk |
| 2005/0220597 | A1 | 10/2005 | Burkett |
| 2006/0062655 | A1 | 3/2006 | Harrelson |
| 2006/0242921 | A1 | 11/2006 | Massie |
| 2008/0050213 | A1 | 2/2008 | Kundel |
| 2009/0057518 | A1 | 3/2009 | Russell |
| 2009/0107065 | A1 | 4/2009 | LeBlang |
| 2009/0267320 | A1 | 10/2009 | Phillips |
| 2011/0011018 | A1 | 1/2011 | Johnson |
| 2011/0033232 | A1 | 2/2011 | Adler |
| 2011/0057090 | A1 | 3/2011 | Spude |
| 2011/0305529 | A1 | 12/2011 | Riggle, Jr. |
| 2012/0131870 | A1 | 5/2012 | deMaere |
| 2013/0020732 | A1 | 1/2013 | Jentsch |
| 2013/0248680 | A1 | 9/2013 | Fergeson |
| 2013/0269284 | A1 | 10/2013 | Hovenier |
| 2014/0263942 | A1 | 9/2014 | Ciuperca |
| 2015/0052839 | A1 | 2/2015 | Rice |
| 2015/0081178 | A1 | 3/2015 | Billaud |
| 2016/0201408 | A1 | 7/2016 | Little |
| 2017/0218614 | A1 | 8/2017 | Ciuperca |
| 2018/0071949 | A1 | 3/2018 | Giles |
| 2018/0112389 | A1 | 4/2018 | Lake |
| 2018/0347213 | A1 | 12/2018 | Clevenger |
| 2018/0347227 | A1 | 12/2018 | Neusch |

FOREIGN PATENT DOCUMENTS

| | | | |
|---|---|---|---|
| DE | 102012206353 | A1 | 10/2013 |
| EP | 3179010 | A1 | 6/2017 |
| FR | 2951149 | B1 | 4/2011 |
| FR | 3032953 | B1 | 8/2016 |
| FR | 3045692 | A1 | 6/2017 |
| JP | 11309687 | A | 11/1999 |

(56) References Cited

FOREIGN PATENT DOCUMENTS

| | | | |
|---|---|---|---|
| JP | 08260705 | A | 2/2005 |
| JP | 2015007337 | A | 1/2015 |
| SU | 903530 | A1 | 2/1982 |

OTHER PUBLICATIONS http://www.aluminumconcreteforms.com/concrete_forming_systems.htm; Wall-Ties & Forms Concrete Forming Systems and Formwork Website Page.

http://www.daytonsuperior.com/search#?sections=products&productlines=forming; Dayton Product Search Website Page.

Dayton Forming Accessories Handbook.

Dayton Rapid Clamp System Manual.

Dayton Steel Ply System Manual.

Harsco LOGIK Forming System Manual.

PCT International Search Report and Written Opinion for PCT Application PCT/US2018/20499; dated Apr. 27, 2018.

PCT International Search Report and Written Opinion for PCT Application PCT/US2018/062473; dated Jan. 28, 2019.

MeadowBurke Sure-Lock Strand Chucks Publication; Oct. 2008.

https://www.nogalesinternational.com/news/bollard-border-fence-draws-good-reviews-on-first-anniversary/article_3c0e21c6-e884-11e1-aedc-001a4bcf887a.html; Aug. 17, 2012.

https://www.nationalreview.com/the-morning-jolt/trumps-great-wall-isnt-whats-being-built/; National Review Website Article Trumps Great Wall Isn't What's Being Built; Dec. 12, 2018.

https://www.businessinsider.com/trump-border-wall-construction-photos-new-mexico-2018-4; Trump Administration Releases New Photos of Border Wall Article; Apr. 11, 2018.

http://theminiaturespage.com/boards/msg.mv?id=452833; The Miniatures Page Message Board Bollard Wall Thread; May 5, 2017.

PCT International Search Report and Written Opinion for PCT Application PCT/US2019/051220; dated Nov. 19, 2019.

BOLLARD SETTING AND INSTALLATION SYSTEM

CROSS REFERENCE TO RELATED APPLICATIONS

The present application is a continuation of U.S. Ser. No. 17/460,477 filed on Aug. 30, 2021, which is a continuation of U.S. application Ser. No. 16/858,523 filed on Apr. 24, 2020 now issued as U.S. Pat. No. 11,105,117, which is a continuation of U.S. application Ser. No. 16/555,537 filed on Aug. 29, 2019 now issued as U.S. Pat. No. 10,633,887. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a bollard setting and installation system for efficiently installing a bollard wall without any restrictions relating to proximity to water or flood plains.

Related Art

Any discussion of the related art throughout the specification should in no way be considered as an admission that such related art is widely known or forms part of common general knowledge in the field.

Recent years have shown the need for efficient systems and methods for installing barriers across a wide range of land. Such barriers often go by many names, such as walls, fences, and the like. Bollard walls, which are formed by a plurality of vertically-oriented bollards or steel slats, are becoming even more popular recently given their frequent mention in the news.

Typical bollard walls have previously included a sheathing extending across the upper portion of the bollards. One such bollard wall is disclosed in U.S. Patent Publication No. 2018/0347227, covering a “Bollard Fence”. The sheathing typically comprises a flat, rectangular plate which extends transverse to and across the bollards of the bollard wall. While this sheathing has made it difficult to climb over the bollard wall due to a lack of gripping surfaces, a number of disadvantages have come to light with use of such sheathed bollard walls.

In the past, such sheathed bollard walls have necessarily been installed a significant distance from any sources of water or any flood plain. Such a requirement is caused by the risk of flood or rising waters, which can apply force against the sheathing and cause the bollard wall to fall or become structurally compromised. This effect is only increased if there is debris in the waters. By removing the need for sheathing, bollard walls may be quickly and efficiently installed at or near a source of water such as a river, since the water and/or debris will simply pass through the gaps between the bollards without being caught on any sheathing or other structure.

SUMMARY

An example embodiment is directed to a bollard setting and installation system. The bollard setting and installation system includes a setting frame which is positioned on a ground surface. A plurality of bollards is positioned on the setting frame in a desired spacing and orientation to form a bollard wall. A vehicle having a vehicle arm connected to a lifting frame is positioned such that the bollards are secured to the lifting frame by clamps in the desired spacing and orientation. The vehicle may then move the lifting frame to position the lower ends of the bollards in an opening in the ground surface. Concrete may be poured to encapsulate the lower ends of the bollards. The lifting frame may then be removed, with the bollard wall being free-standing in the ground surface.

There has thus been outlined, rather broadly, some of the embodiments of the bollard setting and installation system in order that the detailed description thereof may be better understood, and in order that the present contribution to the art may be better appreciated. There are additional embodiments of the bollard setting and installation system that will be described hereinafter and that will form the subject matter of the claims appended hereto. In this respect, before explaining at least one embodiment of the bollard setting and installation system in detail, it is to be understood that the bollard setting and installation system is not limited in its application to the details of construction or to the arrangements of the components set forth in the following description or illustrated in the drawings. The bollard setting and installation system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
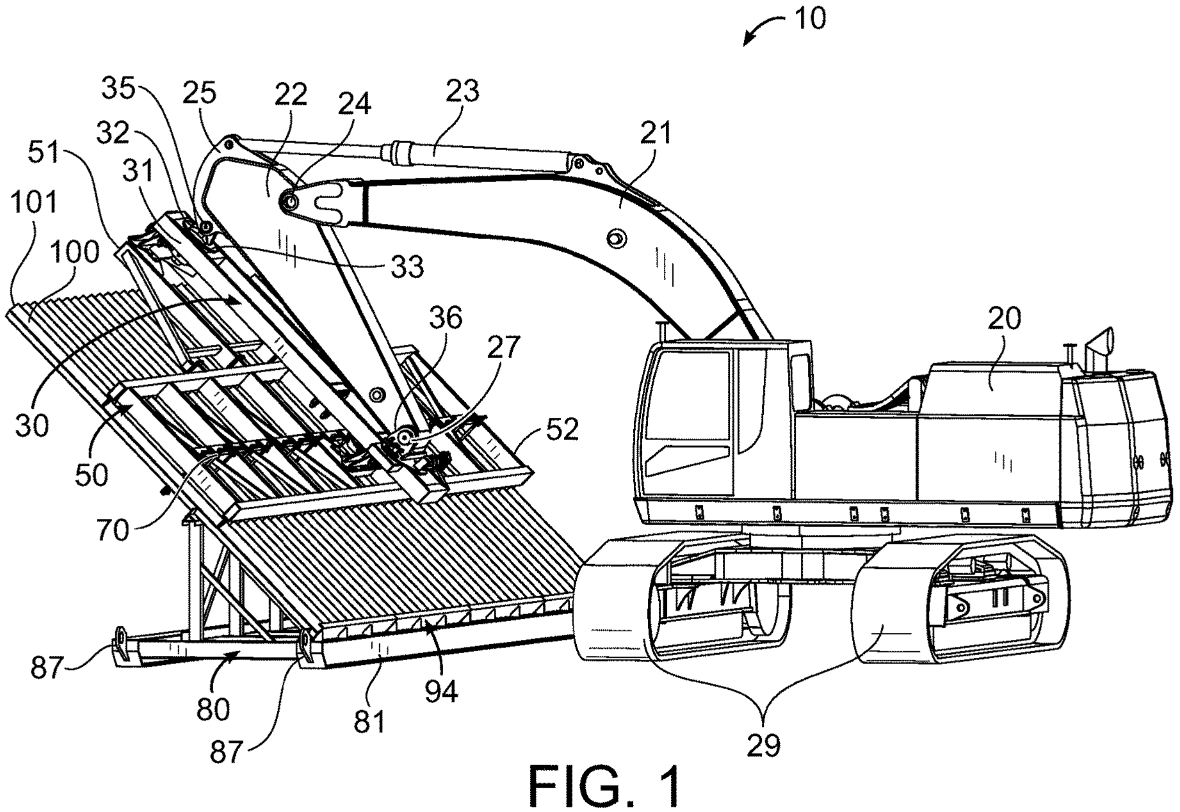
FIG. 1 is a perspective view of a bollard setting and installation system in accordance with an example embodiment.
Figure 2:
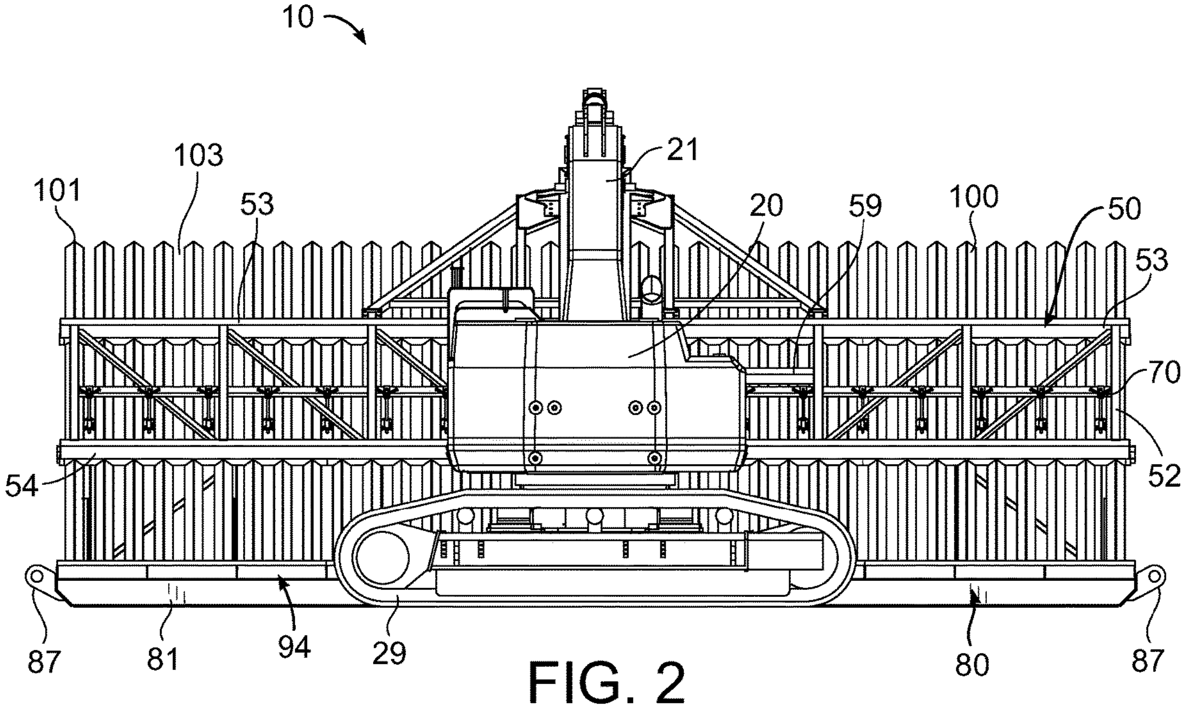
FIG. 2 is a rear view of a bollard setting and installation system in accordance with an example embodiment.

A. Overview.

An example bollard setting and installation system 10 generally comprises a vehicle 20 adapted to traverse a ground surface 11, wherein the vehicle includes an arm 21 extending from the vehicle 20, an arm coupler 22 connected to the arm 21, and a plurality of wheels or a plurality of tracks 29 connected to a motor. A lifting frame 50 is connected to the arm coupler 22 of the arm 21 of the vehicle 20, wherein the lifting frame 50 is comprised of a first plurality of bollard receivers 55, 56, wherein each of the first plurality of bollard receivers 55, 56 is adapted to receive one of a plurality of bollards 100 such that the plurality of bollards 100 are arranged in a desired spacing and orientation.

A plurality of clamps 70 is connected to the lifting frame 50, wherein each of the plurality of clamps 70 extends between a pair of the plurality of bollards 100 and wherein the plurality of bollards 100 are removably connected to the lifting frame 50 by the plurality of clamps 70 in the desired spacing and orientation. The first plurality of bollard receivers 55, 56 may comprise a plurality of projections 57 which are spaced-apart so as to define a plurality of openings 58 between the plurality of projections 57, wherein each of the plurality of openings 58 is adapted to receive one of the plurality of bollards 100.

The first plurality of bollard receivers 55, 56 may comprise a plurality of upper bollard receivers 55 and a plurality of lower bollard receivers 56, wherein the plurality of upper bollard receivers 55 are positioned at or near an upper end 53 of the lifting frame 50 and the plurality of lower bollard receivers 56 are positioned at or near a lower end 54 of the lifting frame 50. Each of the plurality of openings 58 of the first plurality of bollard receivers 55, 56 may be triangular.

A coupler 30 may be used for connecting the lifting frame 50 to the arm coupler 22, wherein the lifting frame 50 is rotatably connected to the coupler 30. Each of the plurality of clamps 70 may be adjustable between a locked position and an unlocked position, wherein each of the plurality of clamps 70 is vertically-oriented when in the unlocked position and horizontally- or diagonally-oriented when in the locked position.

A setting frame 80 positioned on a ground surface 11, wherein the setting frame 80 is adapted to receive the plurality of bollards 100 in the desired spacing and orientation, wherein the setting frame 80 is comprised of a second plurality of bollard receivers 90, 94, wherein each of the second plurality of bollard receivers 90, 94 is adapted to receive one of the plurality of bollards 100, wherein the lifting frame 50 is adapted to retrieve the plurality of bollards 100 in the desired spacing and orientation from the setting frame 80.

A method of installing a bollard wall 15 using the bollard setting and installation system 10 may the steps of positioning the plurality of bollards 100 within the second plurality of bollard receivers 90, 94 of the setting frame 80 in the desired spacing and orientation, inserting the plurality of clamps 70 of the lifting frame 50 between the plurality of bollards 100 positioned within the setting frame 80, securing the plurality of bollards 100 to the lifting frame 50 in the desired spacing and orientation by rotating each of the plurality of clamps 70 into a locked position, lifting the lifting frame 50 and the plurality of bollards 100 by the arm 21 of the vehicle 20, moving the arm 21 of the vehicle to a desired location, lowering the plurality of bollards 100 into an opening 12 in the ground surface 11 by the arm 21 of the vehicle 20, encasing the lower ends 102 of each of the plurality of bollards 100 in concrete 19, and releasing the plurality of bollards 100 from the lifting frame 50 by rotating the plurality of clamps 70 into an unlocked position.

Another example bollard setting and installation system 10 generally comprises a setting frame 80 positioned on a ground surface 11, wherein the setting frame 80 is adapted to receive a plurality of bollards 100, wherein the setting frame 80 is comprised of a first plurality of bollard receivers 90, 94, wherein each of the first plurality of bollard receivers 90, 94 is adapted to receive one of the plurality of bollards 100 such that the plurality of bollards 100 are arranged in a desired spacing and orientation to form a bollard wall 15.

A vehicle 20 is adapted to traverse the ground surface 11, wherein the vehicle includes an arm 21 extending from the vehicle 20, an arm coupler 22 connected to the arm 21, and a plurality of wheels or a plurality of tracks 29 connected to a motor. A coupler 30 may be connected to the arm coupler 21 of the vehicle 20 and a lifting frame 50 may be connected to the coupler 30.

A plurality of clamps 70 may be rotatably connected to the lifting frame 50, wherein each of the plurality of clamps 70 extends between a pair of the plurality of bollards 100, wherein each of the plurality of clamps 70 is adjustable between a locked position and an unlocked position, wherein the plurality of bollards 100 are removably connected to the lifting frame 50 by the plurality of clamps 70 in the desired spacing and orientation. Each of the plurality of clamps 70 may be vertically-oriented when in the unlocked position and horizontally- or diagonally-oriented when in the locked position. Each of the plurality of clamps 70 may be comprised of a first projection 74 and a second projection 75, wherein the second projection 75 is heavier than the first projection 74.

An upper end 53 of the lifting frame 50 may be rotatably connected to the coupler 30 by an upper frame support 40 and a lower end 54 of the lifting frame 50 may be rotatably connected to the coupler 30 by a lower frame support 42. An actuator 45 may be connected between the lifting frame 50 and the coupler 30 for rotating the lifting frame 50 with respect to the coupler 30.

The first plurality of bollard receivers 90, 94 may comprise a plurality of projections 96 which are spaced-apart so as to define a plurality of openings 97 between the plurality of projections 96, wherein each of the plurality of openings 97 is adapted to receive one of the plurality of bollards 100. Each of the plurality of projections 96 of the first plurality of bollard receivers 90, 94 may be comprised of an isosceles trapezoidal shape and each of the plurality of openings 97 of the first plurality of bollard receivers 90, may be comprised of a triangular shape.

The lifting frame 50 may comprise a second plurality of bollard receivers 55, 56, wherein each of the second plurality of bollard receivers 55, 56 is adapted to receive one of the plurality of bollards 100 such that the plurality of bollards 100 are arranged in the desired spacing and orientation. The second plurality of bollard receivers 55, 56 may comprise a plurality of upper bollard receivers 55 at an upper end 53 of the lifting frame 50 and a plurality of lower bollard receivers 56 at a lower end 54 of the lifting frame 50.

B. Vehicle.

As shown throughout the figures, a vehicle 20 may be utilized to lift, support, move, adjust, and retain a lifting frame 50, with the lifting frame 50 holding a plurality of bollards 100 in a desired positioning, spacing, and orientation to form a bollard wall 15. While the figures illustrate the vehicle 20 as comprising an excavator, it should be appreciated that a wide range of vehicles 20 may be utilized, such as trucks, cars, loaders, and the like. The vehicle 20 may include a motor for effectuating movement along the ground surface 11.

As best shown in FIG. 1, each vehicle 20 may include an arm 21 which is movably connected to the vehicle 20. The arm 21 is generally controlled from within the cab of the vehicle 20, though external or remote controls may be utilized in some embodiments. The arm 21 may include an arm coupler 22 at its distal end which is utilized to interconnect the arm 21 with the lifting frame 50. In some embodiments, a separate coupler 30 may be connected to the lifting frame 50, with the coupler 30 being connected to the arm coupler 22 of the arm of vehicle 20.

As shown in FIGS. 1, 2, and 13-18, each vehicle 20 may traverse the ground surface 11 using a plurality of tracks 29. Although not shown, it should be appreciated that the vehicle 20 may instead use wheels or any other device known to permit a vehicle 20 to traverse a ground surface 11. In some embodiments, the vehicle 20 may be on rails or the like.

Figure 3:
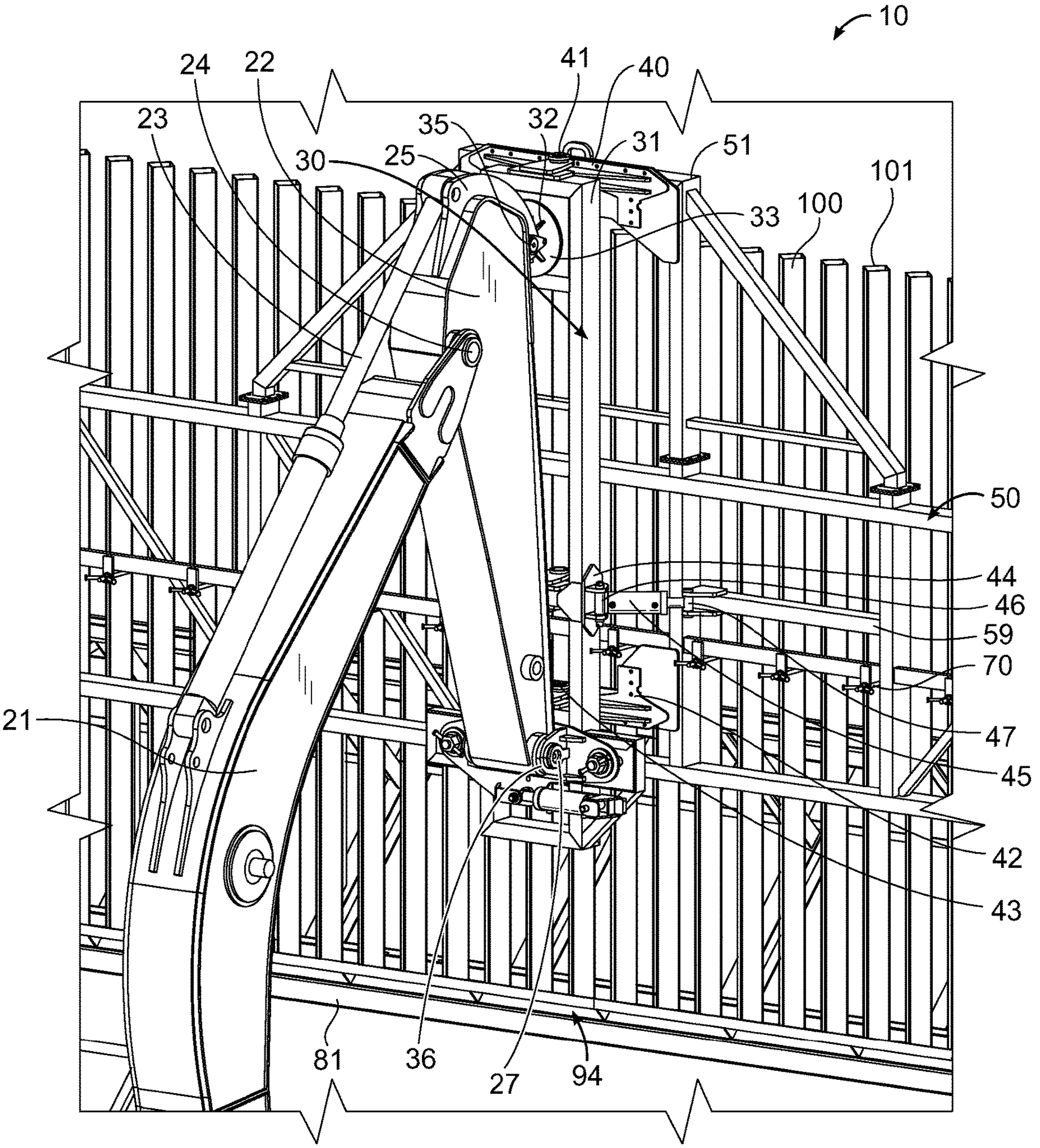
FIG. 3 is a rear perspective view of a bollard setting and installation system in accordance with an example embodiment.
Figure 13:
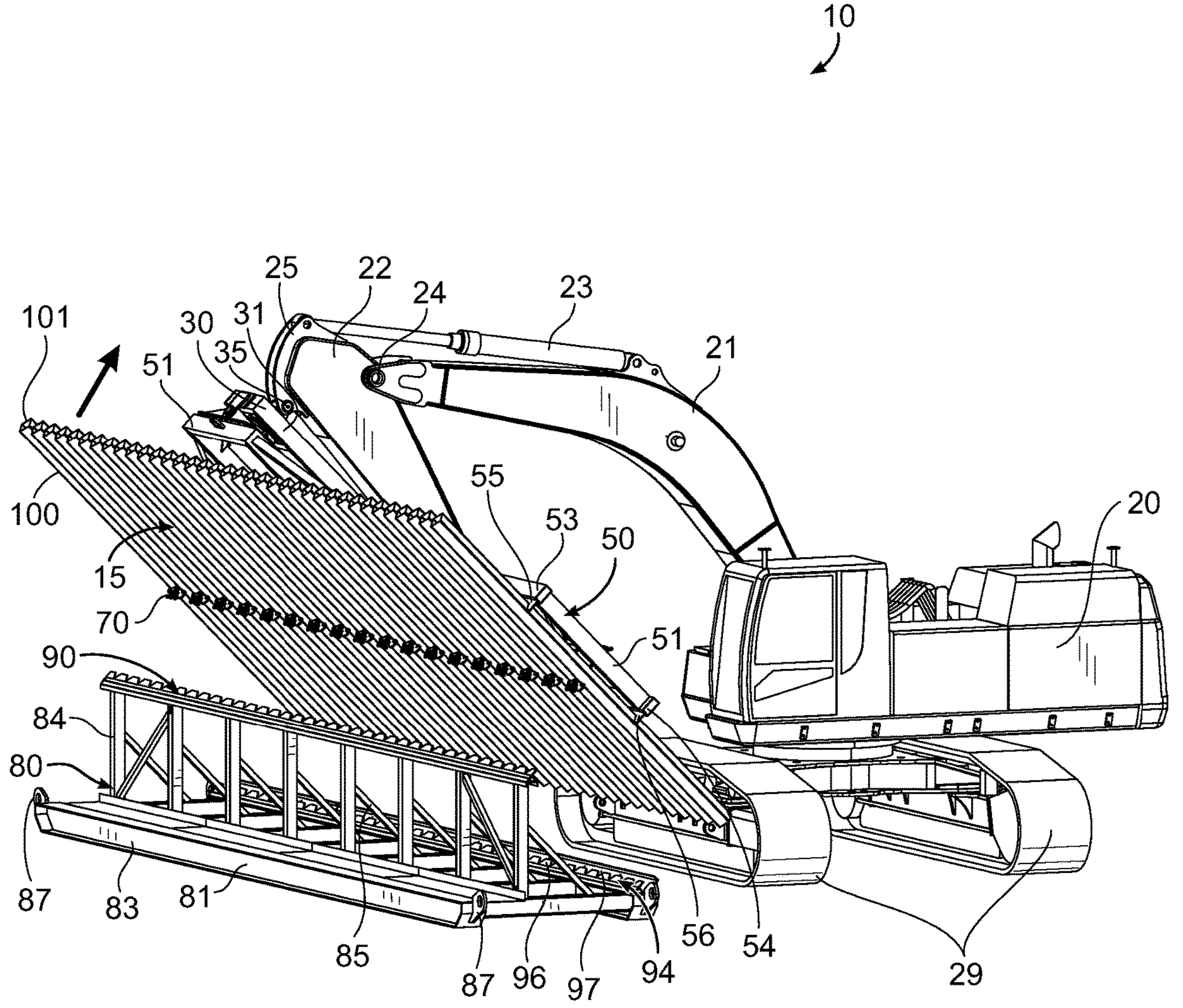
FIG. 13 is a perspective view of a lifting frame and bollards being lifted from a setting frame by a vehicle of a bollard setting and installation system in accordance with an example embodiment.

The arm coupler 22 may be rotatably (hingedly) connected to the arm 21 via a hinge 24 as shown in FIGS. 1, 3, and 13. In the figures, the arm coupler 22 is illustrated as being adapted to rotate about a pitch axis. It should be appreciated, however, that in alternate embodiments the arm coupler 22 may be adapted to rotate about one or more axes, including pitch, roll, and/or yaw.

As shown in FIGS. 1 and 3, an actuator 23 is illustrated as being connected between the arm 21 and the arm coupler 22 so as to adjust the pitch of the arm coupler 22. In embodiments in which additional or different axes of rotation are implemented, additional actuators 23 may be utilized. Further, it should be appreciated that various types of actuators 23 may be utilized, and thus the scope should not be construed as limited to hydraulic actuators 23 as shown in the figures.

The arm coupler 22 may be adapted to connect to the lifting frame 50, such as by use of a pair of frame supports 40, 42 as shown in FIG. 3. The lifting frame 50 may be adapted to support the bollards 100 in a desired position and orientation when forming the bollard wall 15. The manner in which the arm coupler 22 connects to the lifting frame 50 may vary in different embodiments. In the exemplary embodiment shown in the figures, the arm coupler 22 is connected to the lifting frame 50 by a coupler 30. The figures and description herein provide merely exemplary embodiments of the arm coupler 22, and it should be appreciated that various aspects of the arm coupler 22, including its size, orientation, shape, number of connectors 25, 27, and the like may vary in different embodiments to suit different applications.

As best shown in FIG. 3, the arm coupler 22 may be connected to the lifting frame 50 by a coupler 30, with the coupler 30 including upper and lower frame supports 40, 42 which engage with the lifting frame 50. In some embodiments, the lifting frame 50 may be directly connected to the arm 21. The lifting frame 50 may be fixedly or removably connected to the arm 21, arm coupler 22, or coupler 30. The coupler 30 may be removably or fixedly connected to the arm 21.

In the exemplary embodiment best shown in FIG. 3, the arm coupler 22 is illustrated as comprising a first arm connector 25 and a second arm connector 27. The first arm connector 25 may be connected to a first connector 32 of the coupler 30. The second arm connector 27 may be connected to a second connector 36 of the coupler 30. In some embodiments, the arm coupler 22 may be directly connected to the lifting frame 50. In such embodiments, the first arm connector 25 may be connected to an upper portion of the lifting frame 50 and the second arm connector 27 may be connected to a lower portion of the lifting frame 50.

Various other configurations could be utilized in different embodiments. For example, in some embodiments the arm coupler 22 and/or the coupler 30 may include more or less connectors 25, 27, 32, 36 than is shown in the exemplary embodiments of the figures.

As best shown in FIG. 3, the first arm connector 25 may comprise a bracket-type structure, such as a pair of spaced-apart members with aligned openings. The aligned openings may be adapted to receive a first connector pin 35 to interconnect the first connector 32 of the coupler 30 with the first arm connector 25 of the arm 21. The first arm connector 25 may be configured to provide a pivotable connection between the first arm connector 25 and the first connector pin 35 in some embodiments.

As best shown in FIG. 3, the second arm connector 27 may comprise an opening or a cylindrical member. Such an opening or cylindrical member may be adapted to receive a second connector pin to interconnect the second connector 36 of the coupler 30 with the second arm connector 27 of the arm 21. The second arm connector 27 may be configured to provide a pivotable connection between the second arm connector 27 and the second connector pin 39 in some embodiments.

While the figures illustrate that the arm coupler 22 comprises arm connectors 25, 27 having openings for receiving a corresponding pin 35, 39, it should be appreciated that the reverse configuration could be utilized in some embodiments. In such embodiments, the arm coupler 22 may comprise pins and the coupler 30 may comprise receivers such as openings.

C. Coupler.

As best shown in FIGS. 1-4, a coupler 30 may be used to connect the lifting frame 50 to the arm 21 of the vehicle 20. By way of example, the coupler 30 may be adapted to engage with a corresponding arm coupler 22 on the arm 21. The type of coupler 30 utilized may vary in different embodiments and should not be construed as limited by the exemplary figures.

In the exemplary embodiment shown in the figures, the coupler 30 is configured so as to permit rotational movement of the lifting frame 50 about various axes. The rotational adjustment of the wall form 30 will allow the bollards 100 to be utilized on uneven surfaces. Such a configuration is similarly shown and described in co-pending U.S. patent application Ser. No. 16/152,641, entitled "Structure Installation System", which was filed on Oct. 5, 2018, and U.S. patent application Ser. No. 16/272,859, entitled "Hybrid Wall Installation System", which are both hereby incorporated by reference.

As best shown in FIGS. 1 and 3, the coupler 30 may comprise a central support 31 which extends between upper and lower portions of the lifting frame 50. It should be appreciated that, in some embodiments, the central support 31 may be taller than the height of the lifting frame 50, such that the central support 31 extends above or below the lifting frame 50. In other embodiments, the central support 31 may be shorter than the height of the lifting frame 50. In the figures, the central support 31 is illustrated as comprising a vertical, elongated, rectangular frame member. Various other configurations could be utilized in different embodiments.

As shown in FIG. 3, the coupler 30 may comprise a pair of connectors 32, 36 for connecting the coupler 30 to the arm 21. A first connector 32 is illustrated as being adapted to engage with a corresponding first arm connector 25 on the arm 21. A second connector 36 is illustrated as being adapted to engage with a corresponding second arm connector 27 on the arm 21. In some embodiments, one of these connectors 32, 36 may be omitted, or additional connectors 32, 36 could be utilized.

The first connector 32 may be positioned at or near the upper end of the lifting frame 50. The first connector 32 may be pivotable such that the lifting frame 50 (and any bollards 100 connected thereto) may pivot with respect to the arm 21. The lifting frame 50 may pivot about a roll axis with respect to the arm 21. The first connector 32 may thus be comprised of a pivotable connector, such as a bearing, axle, or the like. This allows the roll of the lifting frame 50 to be adjusted to ensure that the lifting frame 50 is properly oriented, even when the vehicle 12 is on tilted or uneven ground.

In the exemplary embodiment of the figures, the first connector 32 comprises a pivot base 33 which may be adapted to pivot about a pivot pin which extends through the pivot base 33. The pivot pin may extend through the coupler 30, with the pivot base 33 (and lifting frame 50 as a whole) pivoting about the pivot pin. The pivot base 33 may in some embodiments comprise a bushing which rotates about the pivot pin.

The first connector 32 may include a first connector pin 35 which is adapted to extend through and engage with the first arm connector 25 of the arm coupler 22. Thus, the first connector pin 35 may extend through the first arm connector 25 so as to engage the first arm connector 25 of the arm coupler 22 with the first connector 32 of the coupler 30.

As best shown in FIG. 3, the second connector 36 of the coupler 30 may be positioned at or near the lower end of the lifting frame 50. The second connector 36 is positioned so as to interconnect and engage with the corresponding second arm connector 27 on the arm 22 coupler. The second connector 36 may be connected directly to the coupler 30 at or near its lower end.

The second connector 36 may comprise various configurations. In the embodiment shown in the figures, the second connector 36 may comprise a bracket including a pair of aligned second connector receivers, or openings, through which a second connector pin may be inserted. The second connector 36 may thus be aligned with the second arm connector 27 such that the second connector receivers are aligned with openings of the second arm connector 27. The second connector pin may be inserted through both the second connector receivers and the second arm connector 27 openings to interconnect the second connector 36 of the coupler 30 with the second arm connector 27 of the arm coupler 22.

The manner in which the lifting frame 50 is connected to the coupler 30 may vary in different embodiments. In the exemplary embodiment shown in the figures, the lifting frame 50 is connected to the coupler 30 by a pair of frame supports 40, 42. As best shown in FIG. 3, an upper frame support 40 may be connected between the coupler 30 and an upper portion of the lifting frame 50 and a lower frame support 42 may be connected between the coupler 30 and a lower portion of the lifting frame 50. The frame supports 40, may comprise brackets, clamps, or other mechanical structures for interconnecting two structures.

The lifting frame 50 may be rotatably connected to the coupler 30 so as to allow adjustment of the lifting frame 50 with respect to the arm 21 of the vehicle 20. By way of example, an exemplary embodiment may utilize an upper pivot 41 connecting the upper frame support 40 to the coupler 30 and a lower pivot 43 connecting the lower frame support 42 to the coupler 30. In this manner, the lifting frame 50 may be rotatable with respect to the coupler 30.

In the exemplary embodiments of the figures, the upper frame support 40 is illustrated as being connected to the upper end of the central support 31 of the coupler 30 and the lower frame support 42 is illustrated as being connected to the lower end of the central support 31 of the coupler 30. It should be appreciated that the frame supports 40, may be connected at other locations of the coupler 30 in different embodiments.

As shown in FIG. 3, an actuator 45 may be utilized so as to rotate the lifting frame 50 about the upper and lower pivots 41, 43 of the upper and lower frame supports 40, 42. In the exemplary embodiment shown, a bracket 44 is shown connected to a side of the coupler 30. More specifically, the bracket 44 is shown as being connected to a side of the central support 31 of the coupler 30, though it should be appreciated that the bracket 44 could be positioned at other locations on the body of the coupler 30.

As shown in FIG. 3, the actuator 45 may be connected between the coupler 30 and the lifting frame 50. More specifically, the actuator 45 is shown as being connected between the bracket 45 on the side of the central support 31 of the coupler 30 and an actuator support 59 on the lifting frame 50. The actuator 45 is shown as being substantially horizontal in orientation (parallel with the ground surface 11). It should be appreciated that in some embodiments, an additional or alternate actuator 45 could be vertically oriented to allow a different range of rotation of the lifting frame 50.

In the exemplary embodiment shown in the figures, the actuator 45 comprises a first end 46 which is connected to the coupler 30, such as to the bracket 44 of the central support 31, and a second end 47 which is connected to the lifting frame 50, such as to an actuator support 59 extending from the lifting frame 50. The actuator 45 may be extended to rotate the lifting frame 50 about the upper and lower pivots 41, 43 in a first direction and retracted to rotate the lifting frame 50 about the upper and lower pivots 41, 43 in a second direction.

D. Lifting Frame.

As shown in FIGS. 1-4, 13, and 14, a lifting frame 50 may be connected to the arm 21 of the vehicle 20. In the embodiments shown in the figures, the lifting frame 50 is connected to a coupler 30, with the coupler 30 being connected to the arm 21 of the vehicle by an arm coupler 22.

It should be appreciated that such exemplary embodiments are not to be construed as limiting in scope. For example, the lifting frame 50 could be connected directly to the arm 21 of the vehicle 20, or to the arm coupler 22 of the arm 21, with the coupler 30 being omitted. The lifting frame 50 may be rotatable about various axes through use of the upper pivot 41 of the upper frame support 40, the lower pivot 43 of the lower frame support 42, and the pivot base 33 and pivot pin 34 of the coupler 30.

The lifting frame 50 is adapted to receive and retain the bollards 100 in a desired position, spacing, and orientation such that the bollards 100 may be moved into position for installation by the vehicle 20 and vehicle arm 21. As discussed in more detail below, the bollards 100 may be initially positioned in the desired spacing and orientation using the setting frame 80 prior to being connected to the lifting frame 50 for installation in a ground surface 11.

The shape, size, and configuration of the lifting frame 50 may vary in different embodiments to suit different types of vehicles 20 and bollards 100, and thus should not be construed as limited by the exemplary embodiments shown in the figures. In the exemplary embodiment shown in FIG. 1, the lifting frame 50 comprises a central support and a bollard support 52.

The central support 51 comprises a vertically-oriented frame which may be rectangular as shown in the figures. Various other shapes may be utilized, however. The bollard support 52 comprises a horizontally-oriented frame which is connected so as to extend outwardly from both sides of the central support 51. In some embodiments, the central support 51 and bollard support 52 may comprise a unitary structure. The central support 51 and bollard support 52 may form an inverted T-shape such as shown in the figures.

The central support 51 of the lifting frame 50 may be connected to the coupler 30 such as shown in FIG. 3. In other embodiments, the central support 51 of the lifting frame 50 may be connected instead to the arm coupler 22 or directly to the arm 21 of the vehicle 20. In the exemplary embodiment shown in the figures, the upper frame support 40 is connected between the coupler 30 and the upper end of the central support 51 of the lifting frame 50 and the lower frame support 42 is connected between the coupler 30 and a point near the lower end of the central support 51 of the lifting frame 50. Other configurations could be utilized in different embodiments.

The central support 51 of the lifting frame 50 may be rotatable connected to the coupler 30 as previously described. As the bollard support 52 is connected to and extends outwardly from the sides of the central support 51, the bollard support 52 will rotate along with the central support 51 when the central support 51 is rotated. The central support 51 may be rotated about the upper pivot 41 of the upper frame support 40 and the lower pivot 43 of the lower frame support 42.

As best shown in FIGS. 1 and 3, the bollard support 52 may comprise a horizontally-oriented rectangular frame which extends outwardly from both sides of the central support 51 such that the lifting frame 50 comprises an inverted T-shaped configuration. The bollard support 52 is adapted to retain the bollards 100 in a desired spacing, positioning, and orientation so as to form a completed bollard wall 15 when positioned in a ground surface 11 as discussed below.

The bollard support 52 may comprise an upper end 53 which includes a plurality of upper bollard receivers 55 and a lower end 54 which includes a plurality of lower bollard receivers 56. The bollards 100 are secured by the bollard support 52, with each bollard 100 extending between an upper bollard receiver 55 and a corresponding lower bollard receiver 56.

Each pair of upper and lower bollard receivers 55, 56 may be aligned so as to receive a bollard 100. The bollard receivers 55, 56 extend along the length of the bollard support 52 such that a plurality of bollards 100 may be secured within the bollard receivers 55, 56 in a desired spacing and orientation. As discussed below, the bollards 100 may be secured within the bollard receivers 55, 56 by clamps 70. Once so secured, the bollards 100 will be set into the desired spacing and orientation for installation in the ground surface 11 to form the bollard wall 15.

Figure 4:
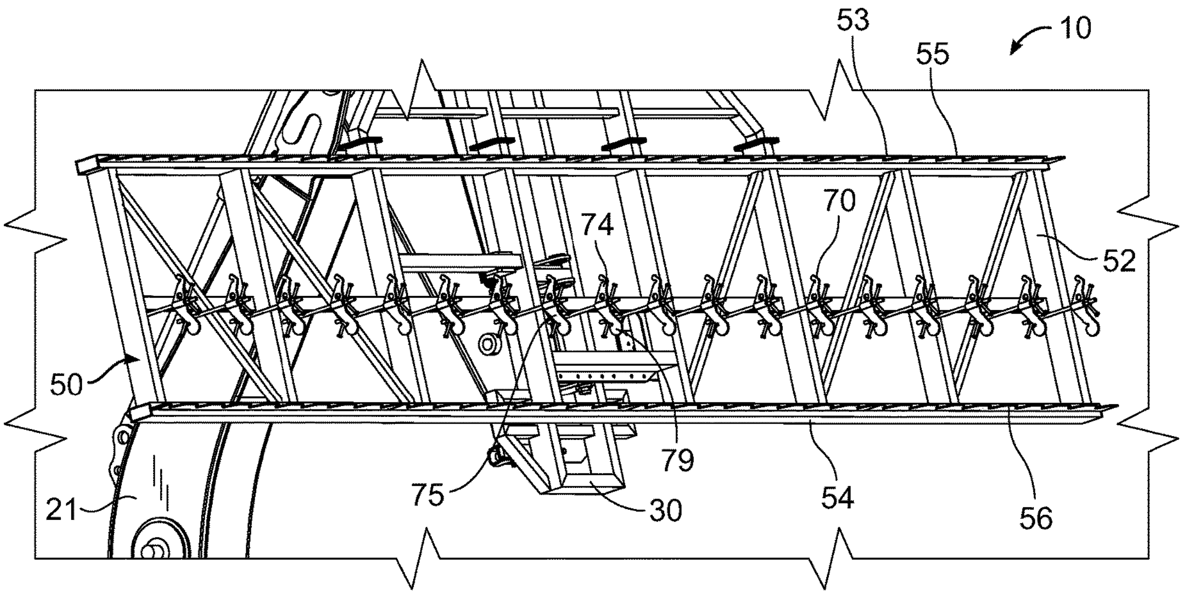
FIG. 4 is a frontal view of an exemplary lifting frame of a bollard setting and installation system in accordance with an example embodiment.

As best shown in FIG. 4, each bollard receiver 55, 56 is comprised of a plurality of notches 58 defined by a plurality of projections 57. The projections 57 extend outwardly from the bollard support 52, with the upper bollard receivers 55 comprising projections 57 extending outwardly from the upper end 53 of the bollard support 52 and the lower bollard receivers 56 comprising projections 57 extending outwardly from the lower end 54 of the bollard support 52.

Each of the bollard receivers 55, 56 comprises a notch 58 or opening which is defined between a pair of projections 57. Each of the plurality of bollards 100 fits within a corresponding notch 58 defined between a pair of projections 57. The upper bollard receivers 55 comprise notches 58 or openings defined between the plurality of projections 57 on the upper end 53 of the bollard support 52 and the lower bollard receivers 56 comprise notches 58 or openings defined between the plurality of projections 57 on the lower end 54 of the bollard support 52.

As shown in the figures, the bollard receivers 55, 56 may comprise a triangular-shape to match the edges of the bollards 100. In the exemplary embodiment shown in the figures, each of the projections 57 comprise an isosceles trapezoid shape, with the notches or openings between the projections 57 each comprising a triangular shape.

With such a configuration, both square-shaped bollards 100 (such as shown in the figures) and triangular-shaped bollards 100 may be supported within the bollard receivers 55, 56. However, it should be appreciated that the bollard receivers 55, 56, including the projections 57 and/or notches 58 encompassing the bollard receivers 55, 56, may comprise other shapes so as to accommodate differently-shaped bollards 100.

As shown in FIG. 3, the lifting frame 50 may comprise an actuator support 59 to which the actuator 45 may be connected. The first end 46 of the actuator 45 is connected to the coupler 30 and the second end 47 of the actuator 45 is connected to the actuator support 59 of the lifting frame 50. The actuator support 59 may comprise a cross-member, such as a rod, beam, or the like, of the lifting frame 50 to which the actuator 45 may be connected.

The lifting frame 50 may also comprise a plurality of clamp receivers 60, each being adapted to receive and engage with a corresponding clamp 70, with the clamps 70 being used to temporarily secure the bollards 100 to the lifting frame 50 in the desired spacing and orientation as discussed below. In the exemplary figures, it can be seen that each of the clamp receivers 60 comprises a bracket-type structure having an opening 61 through which the clamp 70 may extend.

Figure 10A:
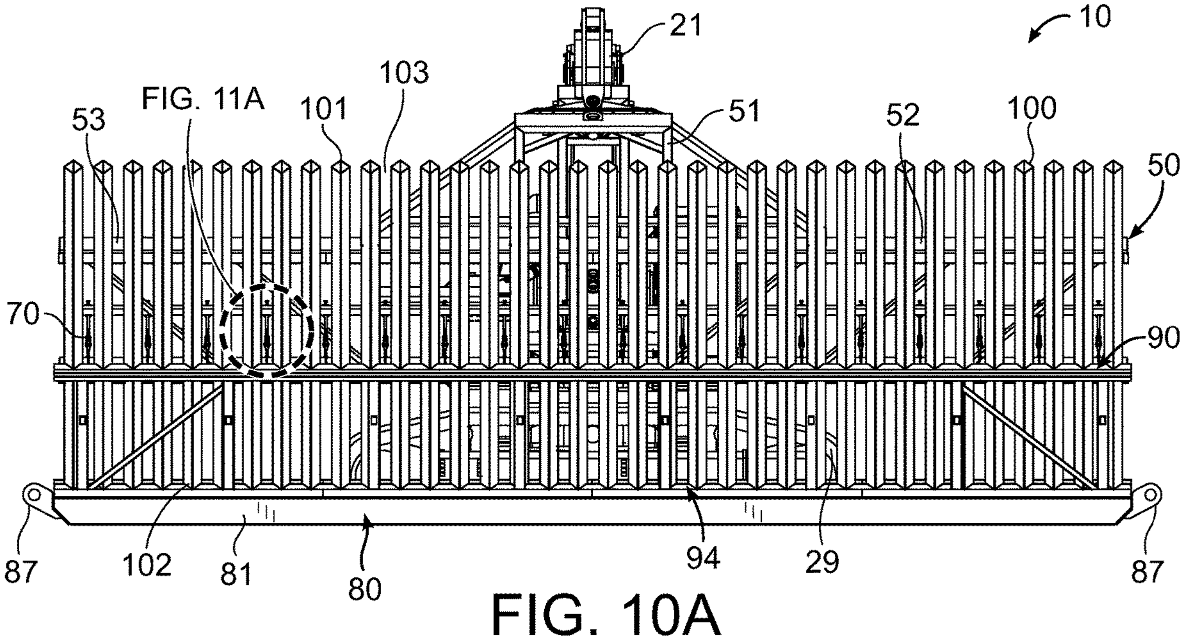
FIG. 10A is a frontal view of a lifting frame of a bollard setting and installation system with clamps in a disengaged or unlocked position in accordance with an example embodiment.
Figure 10B:
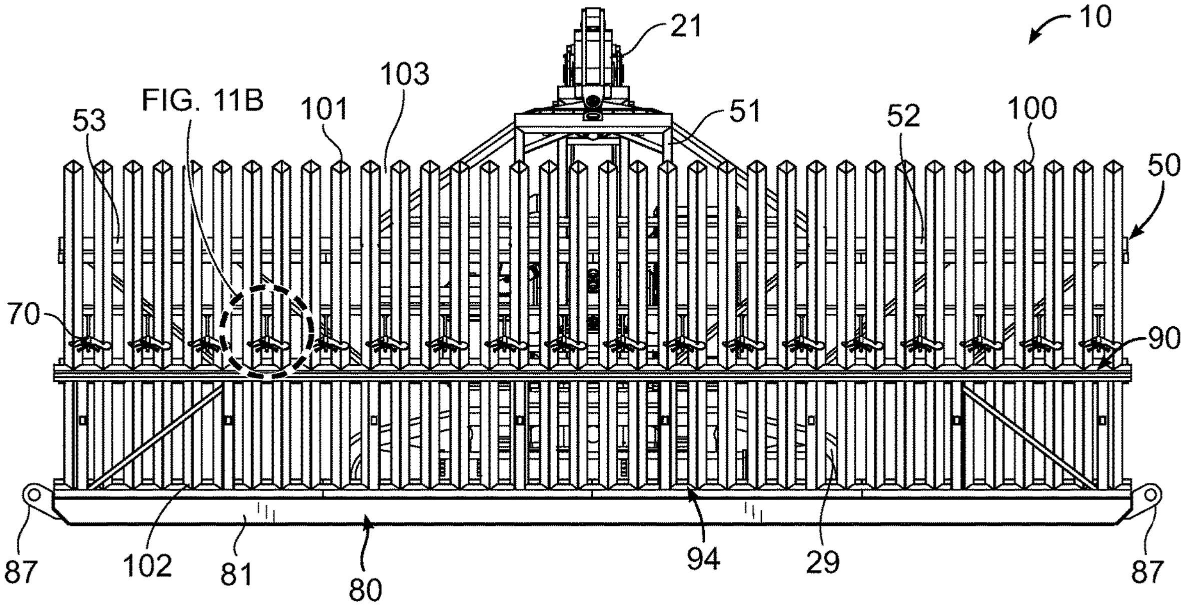
FIG. 10B is a frontal view of a lifting frame of a bollard setting and installation system with clamps in an engaged or locked position in accordance with an example embodiment.

In the exemplary embodiment shown in the figures, the clamp receivers 60 are connected to a central member 64 which extends across the width of the lifting frame 50. It should be appreciated that the clamp receivers 60 may be positioned at other locations on the lifting frame 50 in different embodiments. The clamp receivers 50 will generally be positioned on the lifting frame 50 such that the clamps 70 are positioned at the approximate mid-point of the height of the bollards 100 such as shown in FIGS. 10A and 10B. Such a configuration allows for optimal weight distribution of the bollards 100 when secured to the lifting frame 50 by the clamps 70.

E. Clamps.

As shown throughout the figures, a plurality of clamps 70 may be utilized to secure the bollards 100 in their desired spacing and orientation to the lifting frame 50. Each of the clamps 70 is generally rotatably connected to the lifting frame 50 such as shown in FIGS. 10A and 10B. In some embodiments, the clamps 70 may be removable entirely from the lifting frame 50, such that the clamps 70 are only connected to the lifting frame 50 when in use for retaining bollards 100 against the lifting frame 50 in the desired spacing and orientation.

The number of clamps 70 used will vary in different embodiments. For example, the number of clamps 70 may be adjusted depending on the number of bollards 100 used to form the bollard wall 15, the length of the resulting bollard wall 15, the weight of the bollards 100, the length of the lifting frame 50, and other considerations.

Figure 11A:
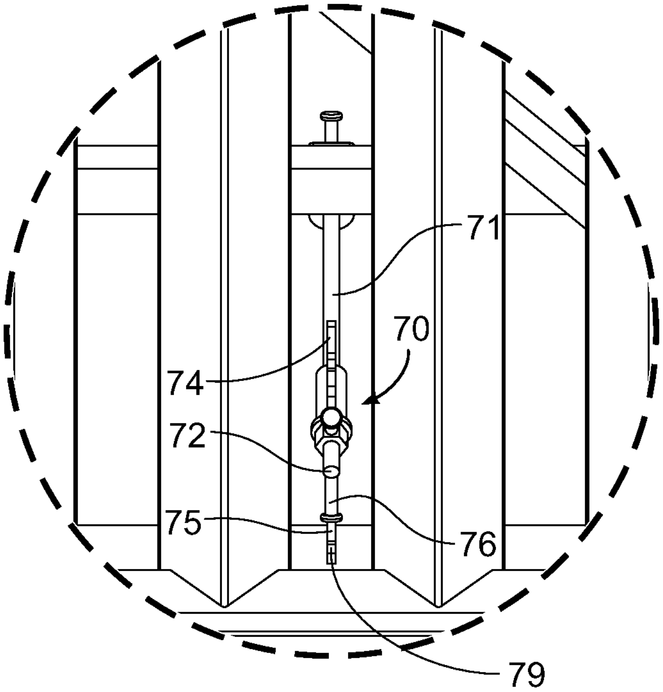
FIG. 11A is a close-up frontal view of a clamp of a bollard setting and installation system in a disengaged or unlocked position in accordance with an example embodiment.
Figure 11B:
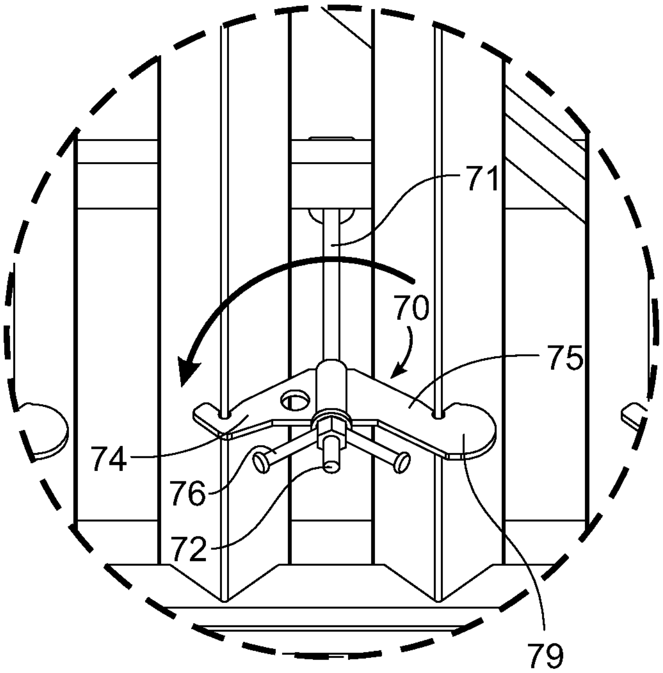
FIG. 11B is a close-up frontal view of a clamp of a bollard setting and installation system in an engaged or locked position in accordance with an example embodiment.

As best shown in FIGS. 3, 11A, and 11B, the clamps 70 may be connected to the lifting frame 50 by clamp receivers 60. In the exemplary embodiment shown in the figures, each of the clamp receivers 60 comprises a bracket or other structure connected to the lifting frame 50 and including a clamp receiver opening 61 in which a clamp 70 may be rotatably secured.

In the exemplary embodiment of the figures, the clamp receivers 60 are each connected to a central member 64 extending across the lifting frame 50, with each of the clamp receivers 60 being aligned. It should be appreciated that other configurations could be utilized. For example, the clamp receivers 60 could be positioned at other locations along the lifting frame 50, such as near the upper end 53 or lower end 54 of the bollard support 52. However, it is preferable that the clamp receivers 60 be positioned such that the clamps 70 will be at the mid-point of the height of the bollards 100 such that there is even weight distribution both above and below each clamp 70.

Figure 21:
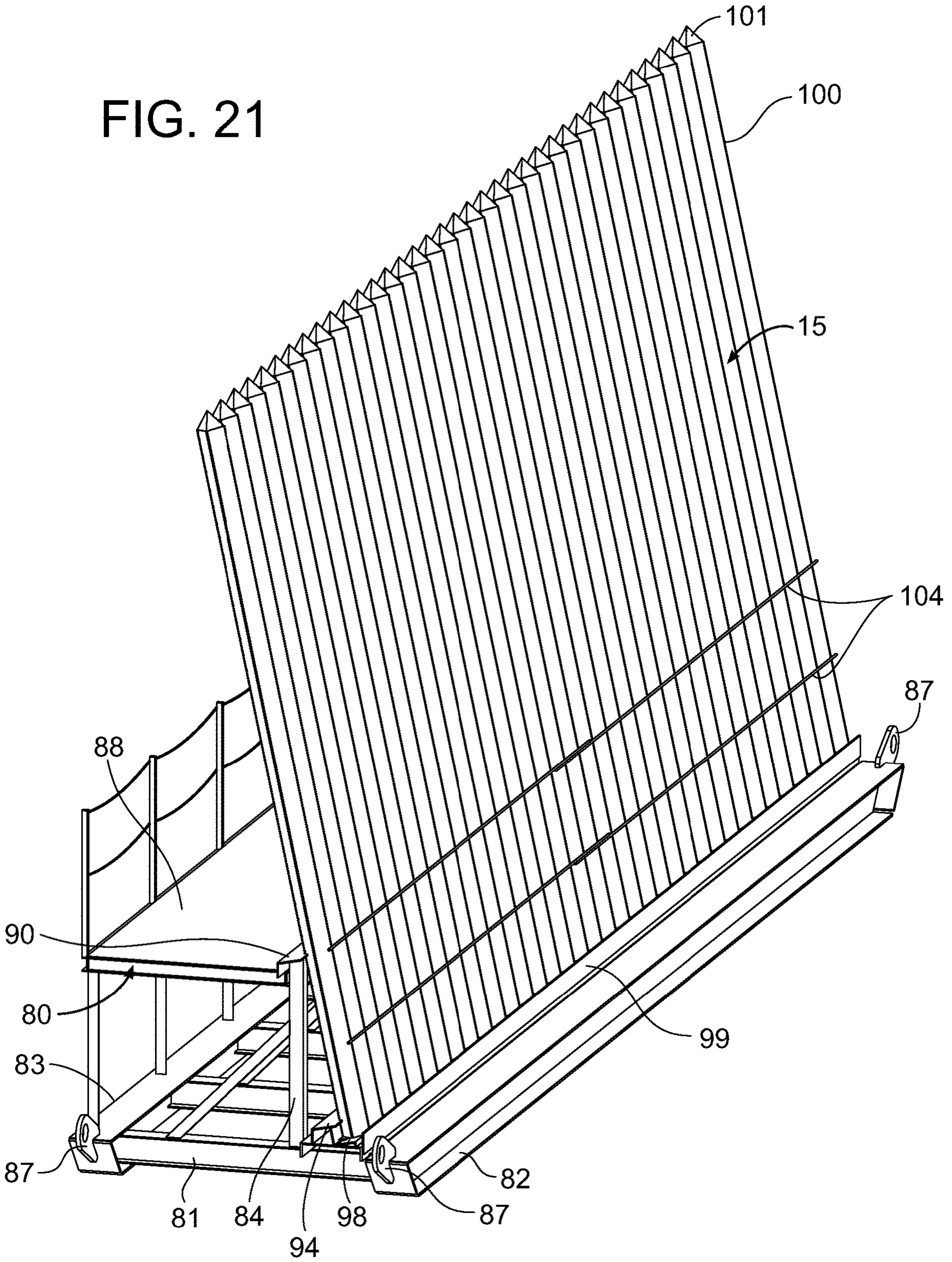
FIG. 21 is a perspective view of bollards positioned in an exemplary setting frame with scaffolding of a bollard setting and installation system in accordance with an example embodiment.

As shown throughout the figures, the clamps 70 are used to removably secure the bollards 100 in a desired spacing and orientation to the lifting frame 50, with the bollards 100 being sandwiched between the lifting frame 50 and the clamps 70 when the clamps 70 are engaged. The clamps 70 generally extend through the gaps 103 between the bollards 100. Although the figures illustrate that each pair of bollards 100 is secured by a clamp 70, it should be appreciated that, in some embodiments, less clamps 70 may be utilized. For example, if the bollards 100 are secured together by cross supports 104 such as shown in FIG. 21 or by a linkage such as a flat bar extending across the lower ends 102 of the bollards 100 as discussed below, less clamps 70 may be utilized to secure the bollards 100 to the lifting frame 50.

The clamps 70 are generally adjustable between a locked or engaged position and an unlocked or released position. FIGS. 10A and 11A illustrate a plurality of clamps 70 in the unlocked or released position. As can be seen, the clamps 70 are vertically-oriented such that they may pass freely through the gaps 103 between the bollards 100. FIGS. 10B and 11B illustrate a plurality of clamps 70 in the locked or engaged position. In this position, the clamps 70 are horizontally- or diagonally-oriented such that they are transverse to the bollards 100. In this position, the bollards 100 are retained against the lifting frame 50.

Various types of clamps 70 may be utilized, and the following description and accompanying figures should thus not be construed as limiting with respect to the structure of the clamps 70. In the exemplary embodiment shown in FIG. 12, each clamp 70 is illustrated as comprising a central rod 71 having a first end 72 and a second end 73. The first end 72 of the central rod 71 is positioned on a first side of the bollards 100 and the second end 73 of the central rod 72 is positioned on a second side of the bollards 100 when the bollards 100 are secured against the lifting frame 50.

Figure 12:
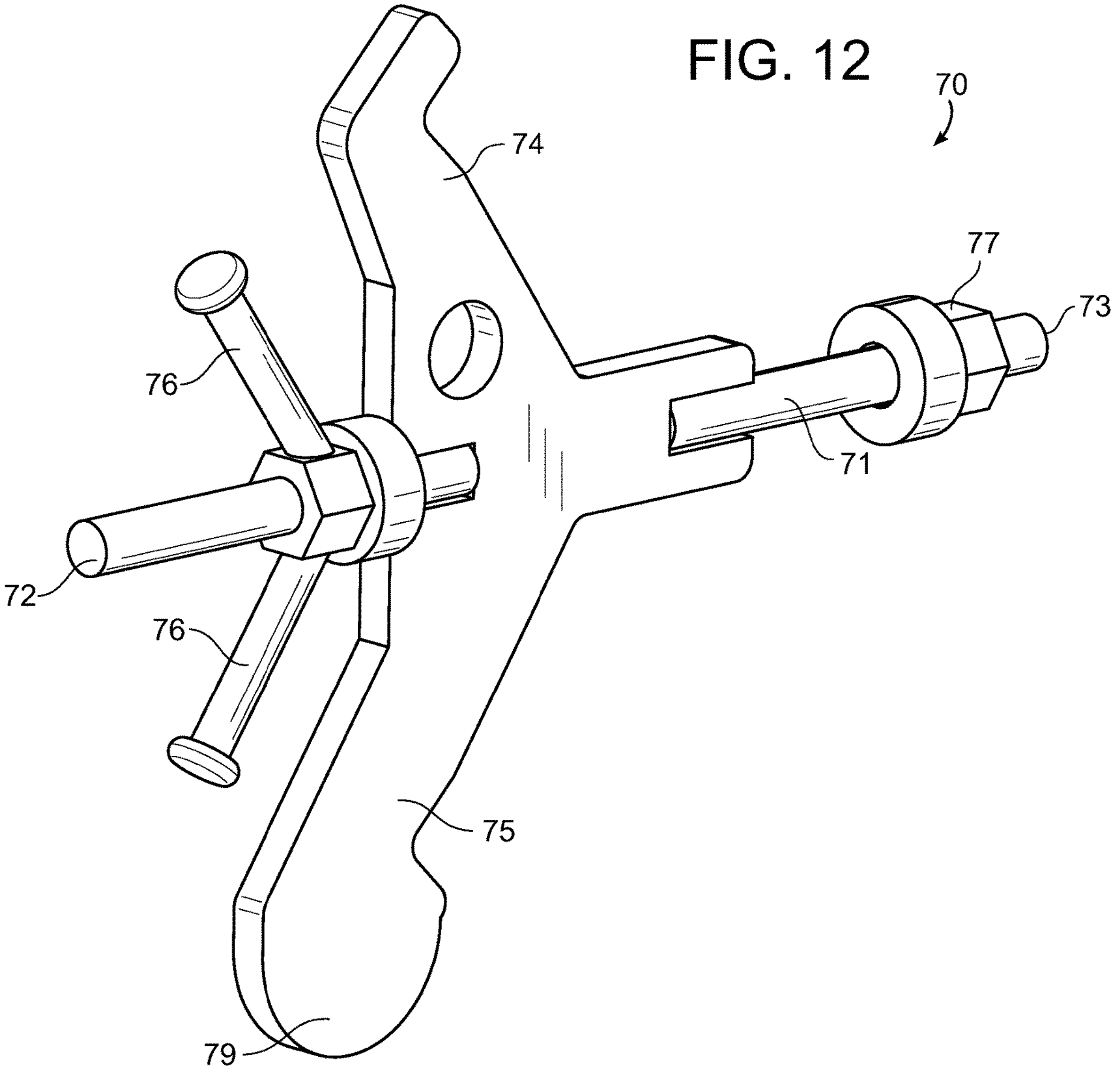
FIG. 12 is a perspective view of an exemplary clamp of a bollard setting and installation system in accordance with an example embodiment.

Continuing to reference FIG. 12, the illustrated exemplary embodiment of a clamp comprises a nut 77 or other securing device which secures the clamp 70 to a clamp receiver 60 such that the clamp 70 may not be removed from the clamp receiver 60 without first removing the nut 77. When the clamp 70 is secured to a clamp receiver 70, the central rod 71 extends through the clamp receiver opening 61. The central rod 71 (and clamp 70 overall) is generally freely rotatable within the clamp receiver 60 such that the clamp 70 may be rotated between the locked and unlocked positions.

As best shown in FIG. 12, the clamp 70 includes a handle 76 which is secured to the central rod 71 at or near the second end 73 of the central rod 71. In the exemplary embodiment shown in the figures, the handle 76 comprises a pair of elongated members extending outwardly at a diagonal angle with respect to the central rod 71. Such a configuration is not meant to be limiting, as the handle 76 could comprise any number of other configurations and need not necessarily utilize two elongated members. When the handle 76 is rotated, the central rod 71 similarly rotates within the clamp receiver 60.

Continuing to reference FIG. 12, the clamp 70 may include a pair of projections 74, 75 which extend outwardly at a right angle with respect to the central rod 71. The projections 74, 75 may be fixedly attached to the central rod 71, or may be integrally formed therewith. In either case, when the central rod 71 is rotated, such as by rotating the handle 76, the projections 74, 75 similarly rotate.

The projections 74, 75 are utilized to secure the clamp 70 against the bollards 100 such that the bollards 100 are sandwiched between the clamp 70 and the lifting frame 50. In the exemplary embodiment shown in the figures, a first projection 74 extends in a first direction from the central rod 71 and a second projection 75 extends in a second direction (opposite to the first) from the central rod 71.

When the projections 74, 75 are vertically-oriented with the clamp 70 in the unlocked or released position, the projections 74, 75 may freely pass through the gap 103 between bollards 100 such as shown in FIG. 10A. When the projections 74, 75 are diagonally- or horizontally-oriented with the clamp 70 in the locked or engaged position such as shown in FIG. 10B, the projections 74, 75 traverse the gap 103 and abut against the bollards 100 such that the bollards 100 are secured against the lifting frame 50 in their desired spacing and orientation.

The manner in which the clamps 70 are adjusted between the locked or engaged position and the unlocked or released position may vary in different embodiments. By way of example, the clamps 70 may be adjusted either manually by hand or mechanically with the use of various tools or actuators. In the exemplary embodiment shown in the figures, the handle 76 may be grasped and turned by hand to rotate the clamps 70 between their positions.

In the exemplary embodiment shown in FIG. 12, the second projection 75 is illustrated as comprising a weighted portion 79. The weighted portion 79 may comprise a wider or heavier piece of material than is used in the first projection 74. The weight portion 79 may be positioned at a distal end of the second projection 75 such as shown in the figures, or at other locations along the second projection 75. The weighted portion 79 aids with rotating the clamp 70, particularly when rotating from a locked position to an unlocked position.

In the exemplary embodiment shown in the figures, the weighted portion 79 is illustrated as comprising a rounded portion at the distal end of the second projection 75, with the first projection 74 not including a weighted portion 79 such that weight distribution between the projections 74, 75 is skewed towards the second projection 75. It should be appreciated that, in some embodiments, the weighted portion 79 may instead be on the first projection 74.

F. Setting Frame.

Figure 8:
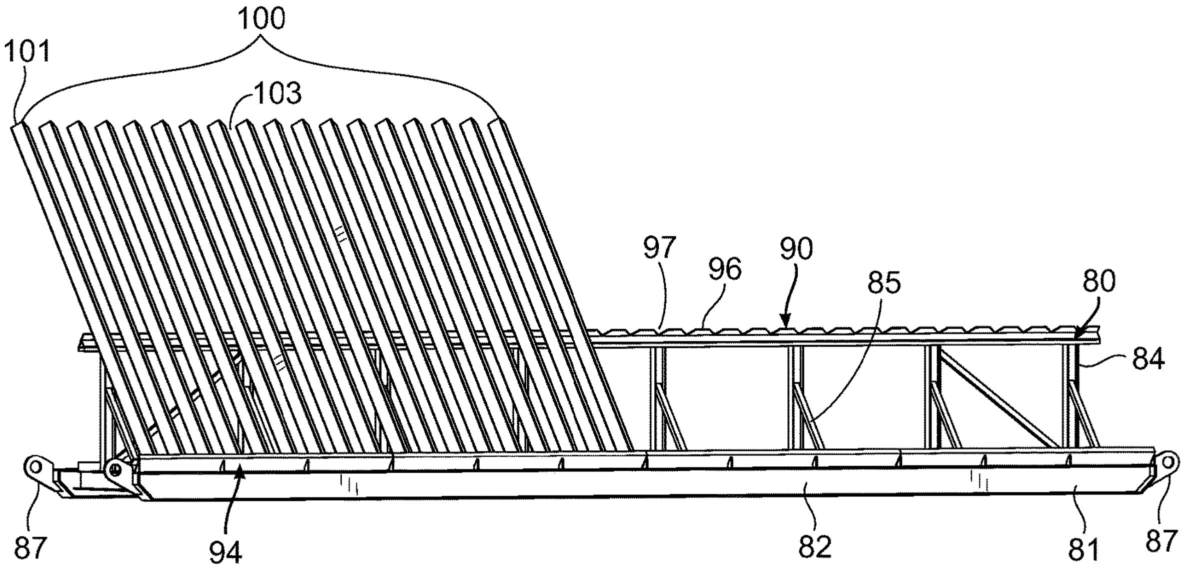
FIG. 8 is a perspective view showing an exemplary setting frame partially filled with bollards of a bollard setting and installation system in accordance with an example embodiment.
Figure 9:
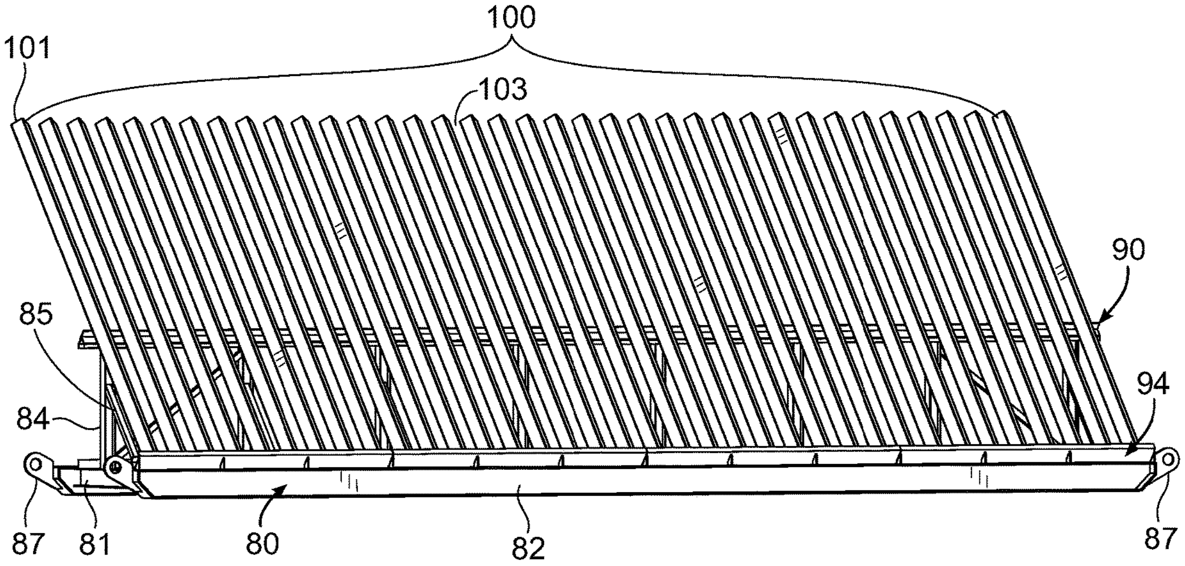
FIG. 9 is a perspective view showing bollards positioned in an exemplary setting frame of a bollard setting and installation system in accordance with an example embodiment.

As shown in FIGS. 8 and 9, a setting frame 80 may be utilized to arrange the bollards 100 in a desired spacing and orientation to form a bollard wall 15. The bollards are positioned in the setting frame 80 in the desired spacing and orientation prior to being secured to the lifting frame 50 for installation. In this manner, it can be assured that the bollards 100 are properly aligned, spaced-apart, and oriented before being lifted by the lifting frame 50.

The setting frame 80 may be positioned on a ground surface 11. Although not shown in the figures, the setting frame 80 could include wheels, tracks, or other devices which allow the setting frame 80 to be moved across the ground surface 11 between locations. In other embodiments, the setting frame 80 could be towed or could be positioned on a vehicle such as a trailer bed.

FIGS. 5-9 illustrate an exemplary embodiment of the setting frame 80 in which the setting frame 80 comprises a base 81 and a setting support 84 extending upwardly from the base 81. The base 81 is generally positioned on the ground surface 11 or on a vehicle such as a trailer bed. The base 81 may include wheels or tracks as mentioned previously. In the exemplary embodiment shown in FIGS. 5-9, the base 81 comprises a pair of elongated members which may act similar to skis such that the setting frame 80 may be dragged or skidded across the ground surface 11, such as by being towed. The base 81 may include a trailer hitch, towing bracket 87, or other connection points to which a towing rig may be secured.

Continuing to reference the exemplary embodiment shown in FIGS. 5-9, the setting frame 80 may comprise a setting support 84 which extends upwardly from the base 81. In such an exemplary embodiment, the setting support 84 may be positioned at the mid-point between the front end 82 and the rear end 83 of the base 81. However, in other embodiments, the setting support 84 may be closer to the front end 82 or closer to the rear end 83. A plurality of diagonally-oriented reinforcement members 85 may be connected between the base 81 and the setting support 84 to provide structural support for the upright setting support 84.

The setting frame 80 may comprise bollard receivers 90, 94 for receiving the bollards 100 in the desired spacing and orientation such as shown in FIGS. 8 and 9. In the exemplary embodiment shown, the bollard receivers 90, 94 comprise upper bollard receivers 90 positioned on the setting support 84 and lower bollard receivers 94 positioned on the base 81. The lower end 102 of each bollard 100 may be secured in the lower bollard receivers 94, with the bollard 100 resting against the upper bollard receivers 90 as shown in FIG. 9.

Each pair of upper and lower bollard receivers 90, 94 may be aligned so as to receive a bollard 100. The bollard receivers 90, 94 extend along the length of the setting frame 80 such that a plurality of bollards 100 may be secured within the bollard receivers 90, 94 in a desired spacing and orientation. The figures illustrate an embodiment in which the bollards 100 rest against the setting frame 80 in a diagonal orientation, with the lower end 102 of each bollard 100 secured within the lower bollard receivers 94.

By orienting the bollards 100 diagonally in the setting frame 80, it will be easier to connect the bollards 100 in the same spacing and orientation to the lifting frame 50 for installation. However, it should be appreciated that, in some embodiments, the bollards 100 may be oriented in other manners. Further, in some embodiments, the bollards 100 may be secured to the setting frame 80 such that the bollards 100 are not accidentally or incidentally moved out of the desired spacing and orientation prior to being retrieved by the lifting frame 50.

Figure 5:
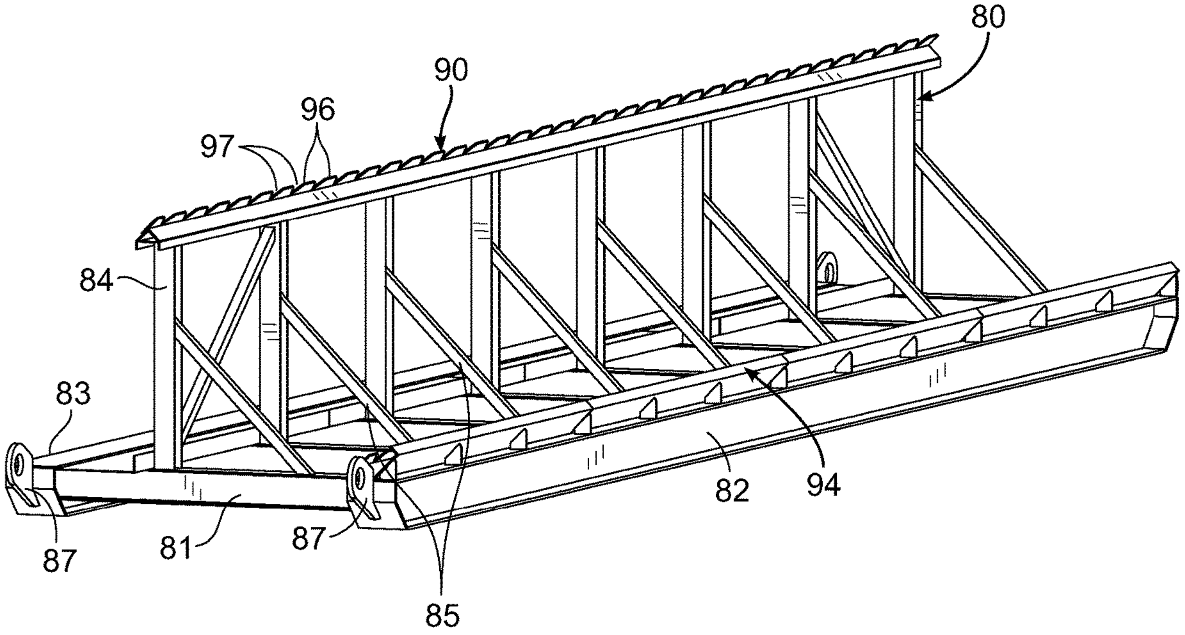
FIG. 5 is a perspective view of an exemplary setting frame of a bollard setting and installation system in accordance with an example embodiment.
Figure 6:
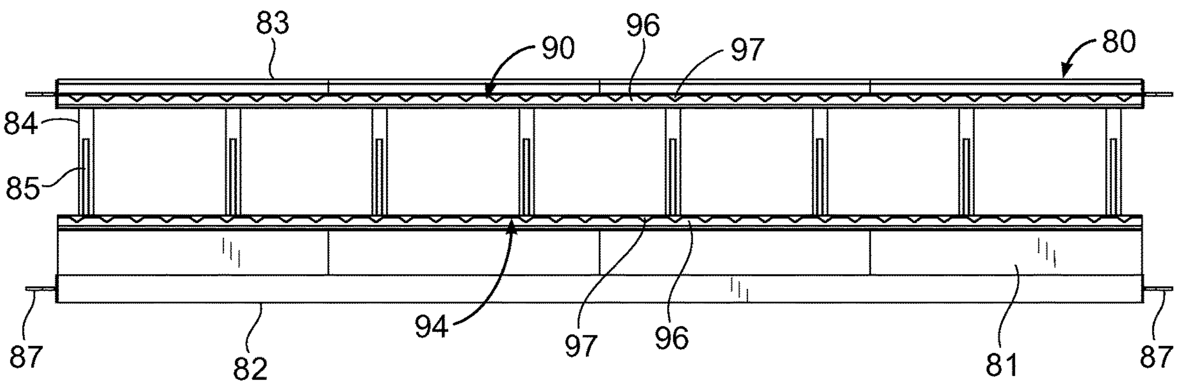
FIG. 6 is a top view of an exemplary setting frame of a bollard setting and installation system in accordance with an example embodiment.
Figure 7:
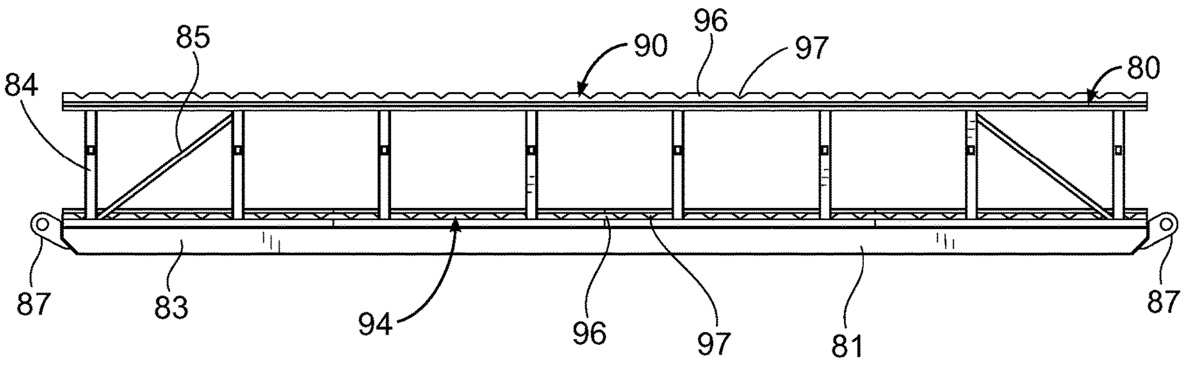
FIG. 7 is a frontal view of an exemplary setting frame of a bollard setting and installation system in accordance with an example embodiment.

As best shown in FIGS. 5-7, each bollard receiver 90, 94 is comprised of a plurality of openings 97 defined by a plurality of projections 96. The projections 96 extend outwardly from the setting frame 80, with the upper bollard receivers 90 comprising projections 96 extending outwardly from upper end of the setting support 84 and the lower bollard receivers 94 comprising projections 96 extending outwardly from the base 81.

Each of the bollard receivers 90, 94 comprises an opening 97 or notch which is defined between a pair of projections 96. Each of the plurality of bollards 100 fits within a corresponding opening 97 defined between a pair of projections 96. The upper bollard receivers 90 comprise notches or openings 97 defined between the plurality of projections on the upper end of the setting support 84 of the setting frame 80 and the lower bollard receivers 94 comprise notches or openings 97 defined between the plurality of projections 96 on the base 81 of the setting frame 80.

As shown in the figures, the bollard receivers 90, 94 may comprise a triangular-shape to match the edges of the bollards 100. In the exemplary embodiment shown in the figures, each of the projections 96 comprise an isosceles trapezoid shape, with the notches or openings 97 between the projections 96 each comprising a triangular shape.

With such a configuration, both square-shaped bollards 100 (such as shown in the figures) and triangular-shaped bollards 100 may be supported within the bollard receivers 90, 94. However, it should be appreciated that the bollard receivers 90, 94, including the projections 96 and/or openings 97 encompassing the bollard receivers 90, 94, may comprise other shapes so as to accommodate differently-shaped bollards 100.

Figure 22:
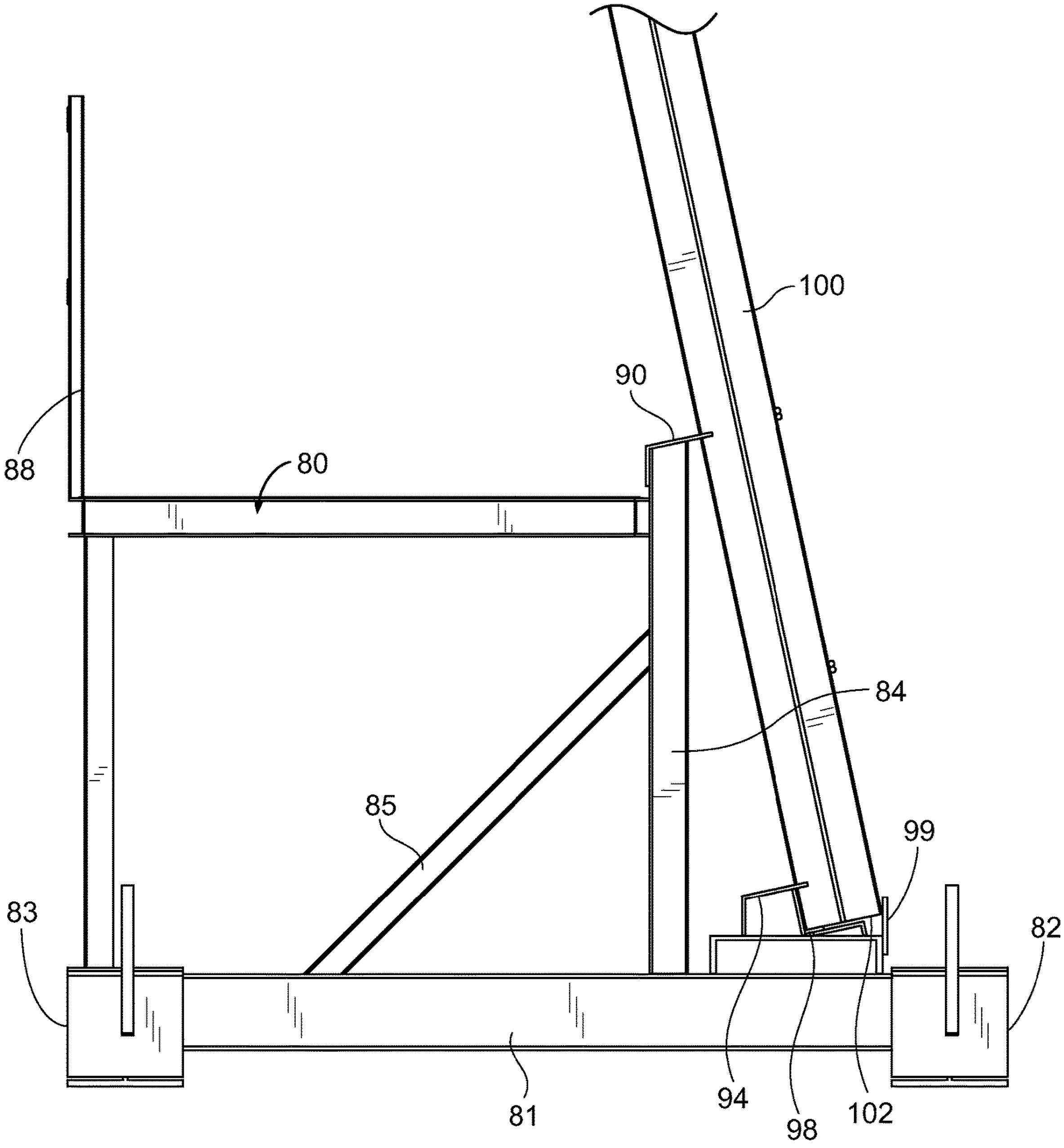
FIG. 22 is a side view of bollards positioned in an exemplary setting frame with scaffolding of a bollard setting and installation system in accordance with an example embodiment.

As best shown in FIG. 22, the base 81 of the setting frame 80 may comprise a flange 99 against which the lower end 102 of each bollard 100 may rest. A bracket 98 may similarly be positioned on the base 81 such as shown in FIG. 22, with the bracket 98 serving to tilt the bollard 100 at an angle towards the upper bollard receivers 90. In this manner, the flange 99 and bracket 98 may serve as a setting or support for the bollards 100 when they are positioned within the bollard receivers 90, 94 of the setting frame 80.

In some embodiments, a linkage member such as a flat bar may be placed along the bracket 98 of the setting frame 80 prior to insertion of the bollards 100 within the setting frame 80. After the bollards 100 have been placed in the setting frame 80, the lower ends 102 of the bollards 100 will rest on the flat bar. The lower ends 102 of the bollards 100 may be connected, such as by welding, to the flat bar, which aids in holding the bollards 100 together in the desired spacing and orientation when the bollards 100 are connected to the lifting frame 50 and lifting out of the setting frame 80.

Figure 20:
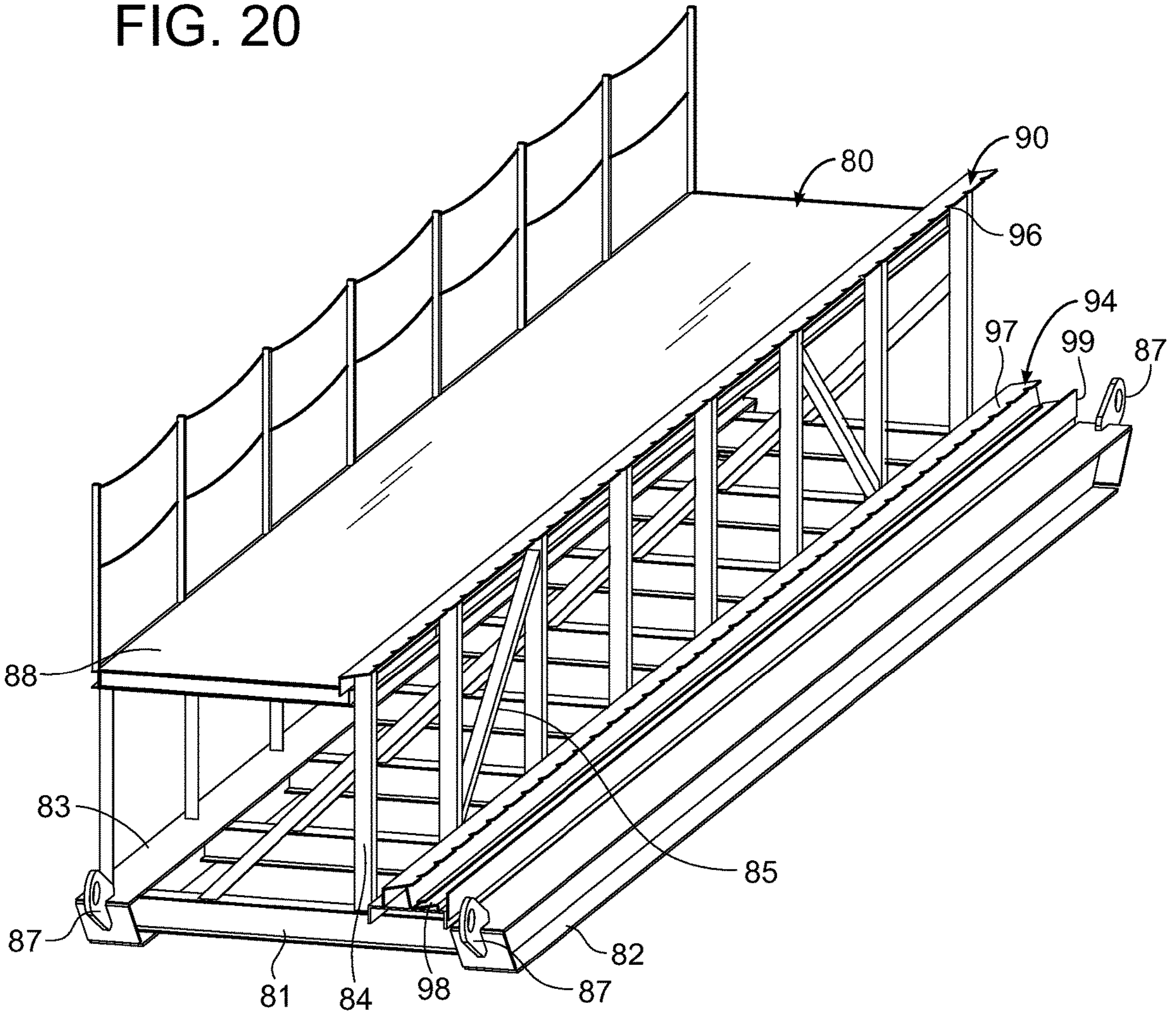
FIG. 20 is a perspective view of an exemplary setting frame with scaffolding of a bollard setting and installation system in accordance with an example embodiment.

FIGS. 20 and 21 illustrate an alternate embodiment of the setting frame 80. In such an embodiment, a scaffolding 88 is provided on which workers may stand to adjust the bollards 100 or secure the clamps 70 to the bollards 100 when transferring the bollards 100 to the lifting frame 50. In such an embodiment, the setting support 84 is positioned closer to the first end 82 of the base 81, with the scaffolding 88 being secured between the second end 83 of the base 81 and the setting support 84. Railing or other safety features may be utilized, with the scaffolding 88 comprising a work platform on which workers may stand. The scaffolding 88 is positioned so as to allow the workers to be optimally positioned to engage the clamps 70 to the bollards 100 when transferring the bollards 100 to the lifting frame 50.

G. Operation of Preferred Embodiment.

Use of the bollard setting and installation system 10, including the methods and systems described herein, allow a bollard wall 15 to be built close to or right up against a waterway 13 such as a river with minimal impact on the waterway 13, such as undesirable impacts on the free flow of water in either direction during flooding or high water conditions.

The resulting bollard wall 15, which does not require an upper sheathing, is flood and water proof. Any debris from flooding may pass through the spaced-apart bollards 100 of the bollard wall 15 without tipping over the bollard wall 15. Further, the bollard may be spaced so as to allow various types of animals to pass freely therethrough while still restricting passage of larger animals or humans passage.

In use, the bollards 100 are first set in the setting frame 80 at their desired spacing and orientation. The bollards 100 may comprise various configurations. The bollards 100 may in some embodiments be solid. The bollards 100 may comprise distally-spaced slats. In other embodiments, the bollards 100 may be hollow and filled with concrete. The shape of the bollards 100 may also vary. Although the figures illustrate the bollards 100 as comprising a square-shaped cross-section, various other shapes may be utilized. Further, the number of bollards 100 making up a bollard wall 15 may vary in different embodiments and should not be construed as limited by the exemplary figures.

The manner in which the bollards 100 are positioned in the setting frame 80 may vary in different embodiments. Due to the weight of the bollards 100, it will typically be necessary to use a vehicle, winch, pulley, or other type of machinery to aid in first lifting each bollard 100 and then lowering each bollard 100 onto the setting frame 80.

Each bollard 100 is positioned within the bollard receivers 90, 94 of the setting frame 80. The lower end 102 of each bollard 100 will be retained by the lower bollard receivers 94, with the body of each bollard 100 resting against the upper bollard receivers such as shown in FIGS. 1, 8, and 9. The bollards 100, when positioned within the setting frame 80, will generally be diagonally-oriented to ease transfer to the lifting frame 50 as discussed below.

The lower ends 102 of the bollards 100 are retained at an angled orientation by resting on the bracket 98 and flange 99 on the base 81 of the setting frame 80 such as shown in FIG. 22. The upper ends 101 of the bollards 100 will generally extend past the upper bollard receivers 90 in a diagonal orientation, with the main body of the bollards 100 resting against the upper bollard receivers 90 of the setting support 84 of the setting frame 80.

Each bollard 100 is positioned within a single lower bollard receiver 94 and a corresponding aligned upper bollard receiver 90, with the bollard 100 resting within the openings 97 of the bollard receivers 90, 94 to prevent movement. While the FIG. illustrate that the bollards 100 are rotated to fit within the triangular openings 97, it should be appreciated that, in other embodiments, the openings 97 may be square-shaped such that the bollards 100 are not so rotated. In other embodiments, the bollards 100 may comprise various other shapes, such as triangular-shaped bollards 100, so long as the bollard receivers 90, 94 are shaped so as to snugly secure the bollards 100 therein prior to retrieval by the lifting frame 50.

FIG. 8 illustrates bollards 100 being set in the setting frame 80. FIG. 9 illustrates all bollards 100 having been set in the setting frame 80 to form a bollard wall 15. The bollards 100 are positioned at a desired spacing and orientation to form the resulting bollard wall 15, and will remain in the same spacing and orientation through being lifted by the lifting frame 50 and secured in the ground surface 11, such as with concrete 19.

If desired, a linkage such as a flat bar may be laid across all or part of the portion of the setting frame 80 on which the lower ends 102 of the bollards 100 will rest when positioned in the setting frame 80. For example, the linkage such as a flat bar may be laid across the bracket 99 which supports the bollards 100 at an angle in the setting frame 80. The linkage may be welded or otherwise connected across the lower ends 102 of all or some of the bollards 100 to aid in holding the bollards 100 in the desired spacing and orientation when the bollards 100 are lifted out of the setting frame 80 by the lifting frame 50 and vehicle 20.

With the bollards 100 positioned in their desired spacing and orientation in the setting frame 80, the vehicle 20 may move toward the setting frame 80 facing the first end 82 of the base 81 of the setting frame 80. The arm 21 of the vehicle 20 may be lowered and/or the arm coupler 22 may be rotated so as to position the lifting frame 50 against the bollards 100 such as shown in FIG. 1. As can be seen, both the lifting frame 50 and the bollards 100 are at the same angle.

The lifting frame 50 is lowered or otherwise adjusted such that the clamps 70 extending from the lifting frame 50 are inserted through the gaps 103 between the bollards 100. Generally, each gap 103 will have a clamp 70 inserted therethrough, though in some embodiments there may be less clamps 70 than there are gaps 103. Optionally, cross supports 104 may be welded or otherwise secured across the bollards 100 such as shown in FIG. 21 to further secure the bollards 100 in their desired spacing and orientation. In other embodiments, a linkage such as a flat bar may be welded across the lower ends 102 of the bollards 100 to further secure the bollards 100 in their desired spacing and orientation.

FIGS. 10A and 11A illustrate the clamps 70 extending through the bollards 100 in an unlocked, released position. In such a position, the clamps 70 are oriented such that the projections 74, 75 of the clamps 70 are vertically-oriented to pass through the gaps 103 between the bollards 100.

The clamps 70 may then be engaged to secure the bollards 100 to the lifting frame 50 in the desired spacing and orientation. FIGS. 10B and 11B illustrate the clamps 70 in a locked, engaged position. Generally, a worker will rotate each of the clamps 70 by ninety degrees such that the projections 74, 75 of the clamps 70 are horizontally-oriented across the gaps 103, with the clamps 70 securing the bollards 100 against the lifting frame 50 in the desired spacing and orientation.

The manner in which the clamps 70 are rotated may vary in different embodiments. The use of a weighted portion 79 on one of the projections 74, 75 eases manual adjustment by a worker. However, it may be desirable to mechanically rotate the clamps 70, such as by use of a drill, actuator, or other device.

With the clamps 70 in their engaged positions, the bollards 100 are firmly secured to the lifting frame 50 in the desired spacing and orientation to form the bollard wall 15. The arm 21 of the vehicle 20 may be raised to lift the lifting frame 50 and attached bollards 100 up and away from the setting frame 80. The vehicle 20 may then travel to the location at which the bollard wall 15 is to be installed.

Figure 14:
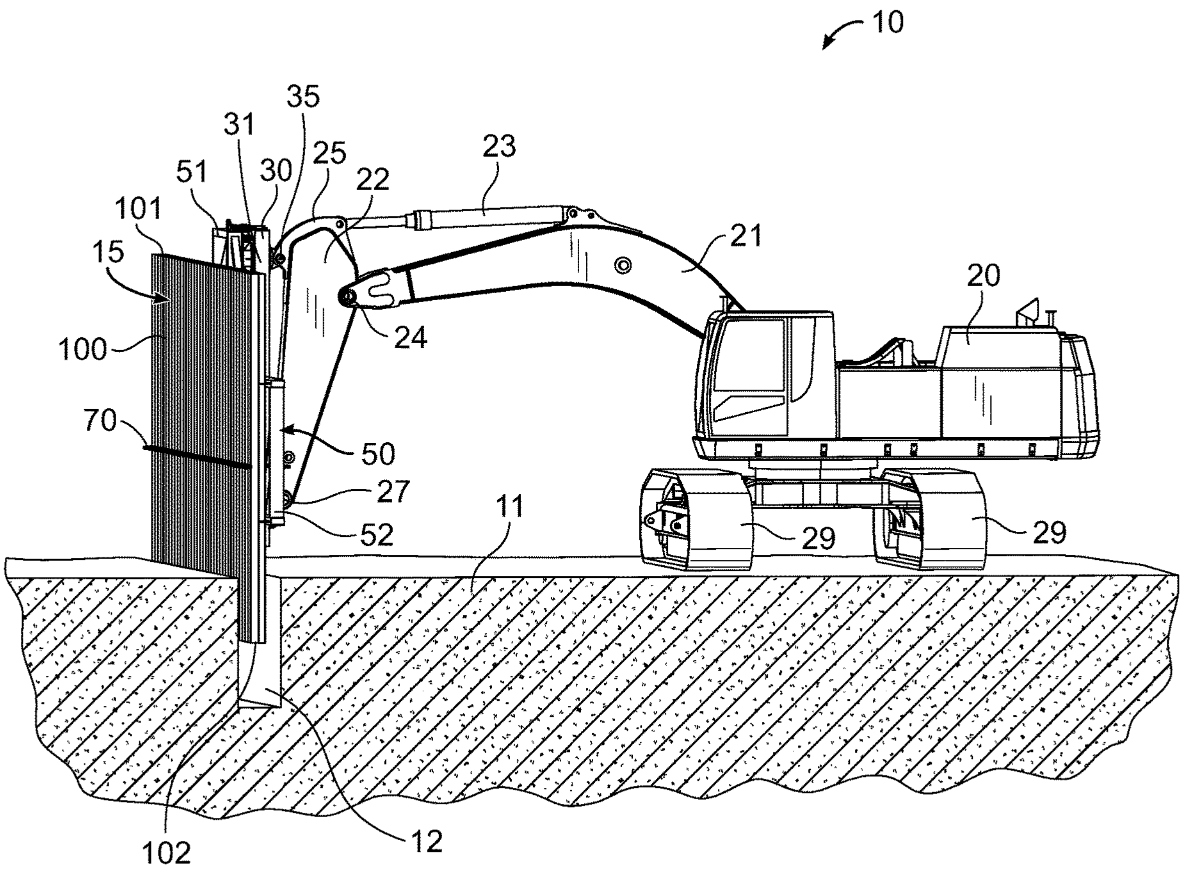
FIG. 14 is a side perspective view of a set of bollards being lowered into an opening in a ground surface by a lifting frame and vehicle of a bollard setting and installation system in accordance with an example embodiment.

Generally, a ground opening 12 will have been previously dug in the ground surface 11, such as a trench as shown in FIG. 14. The arm 21 of the vehicle 20 will move the lifting frame 50 and attached bollards 100 into position and then lower the bollards 100 into the ground opening 12. The lower ends 102 of the bollards 100 are positioned within the ground opening 12, with the upper ends 101 of the bollards 100 being positioned above-grade. The lifting frame 50 and bollards 100 secured thereto may be rotated about various axes, such as by use of rotating the lifting frame 50 with respect to the coupler 30 by use of the actuator 45 and upper and lower pivots 41, 43 of the frame supports 40, 42. In this manner, the bollards 100 may be optimally positioned even on uneven ground.

Figure 15:
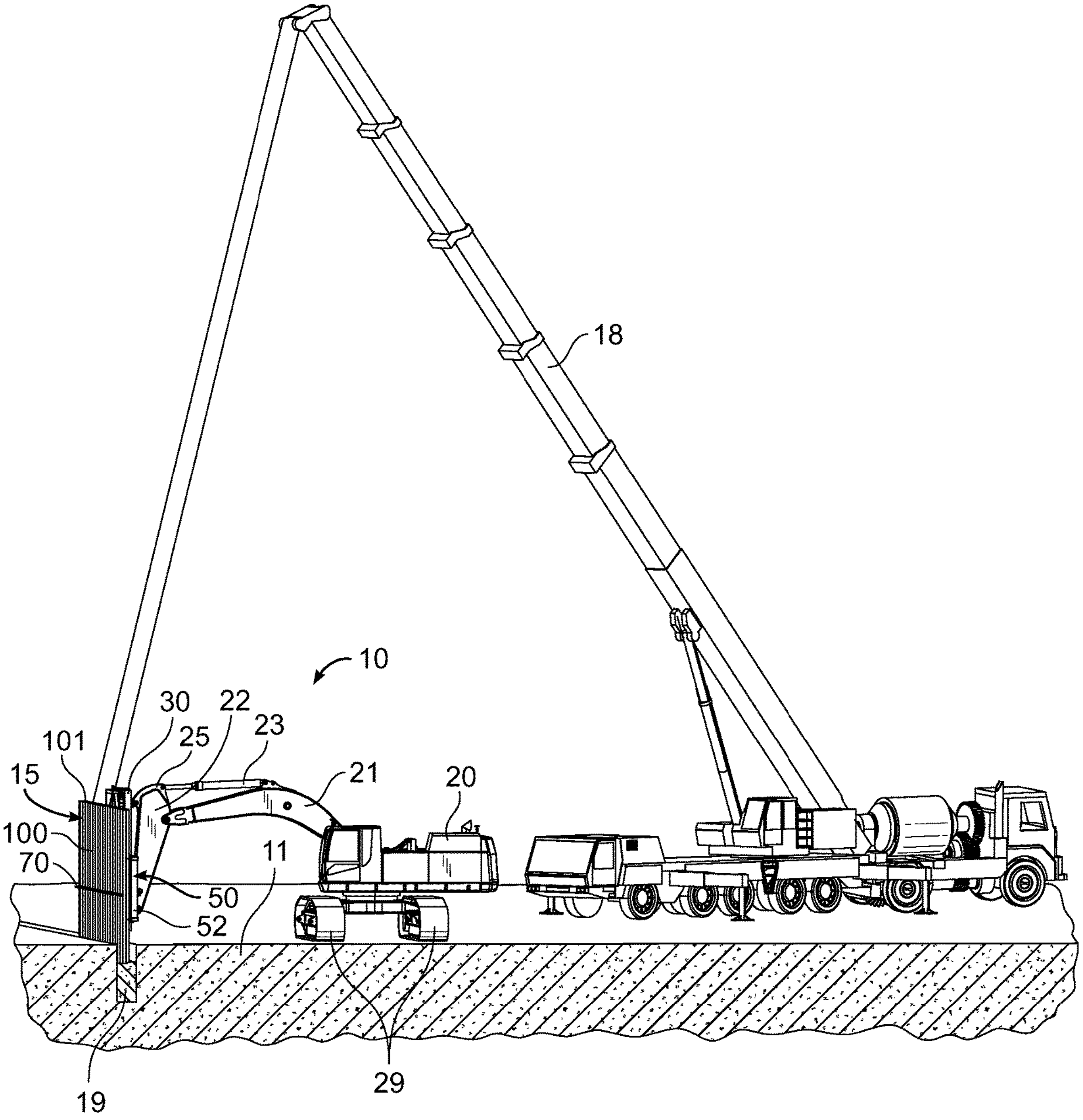
FIG. 15 is a side perspective view of concrete being poured to encapsulate the lower ends of bollards held in an opening in a ground surface by a lifting frame and vehicle of a bollard setting and installation system in accordance with an example embodiment.

With the bollards 100 held in place within the ground opening 12, concrete 19 may be poured into the ground opening 12 so as to encapsulate the lower ends 102 of the bollards 100 such as shown in FIG. 15. Although a concrete boom 18 is illustrated as pouring the concrete 19, it should be appreciated that various other methods may be utilized, including manual filling by hand or by use of a concrete mixer and auger or other conveyor.

Figure 16:
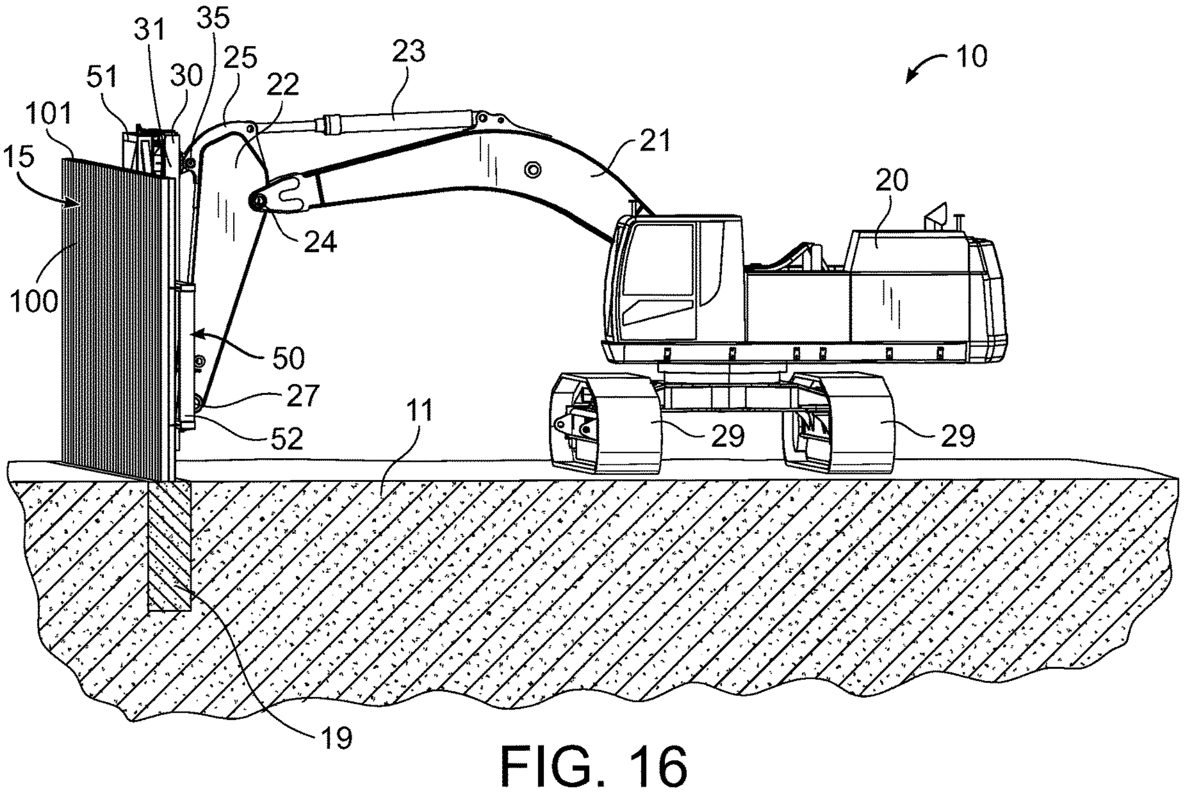
FIG. 16 is a side perspective view of a set of bollards having been encapsulated in concrete of a bollard setting and installation system in accordance with an example embodiment.

The concrete 19 will be allowed to cure around the lower ends 102 of the bollards 100 to form a below-grade base for the bollard wall 15 such as shown in FIG. 16. The concrete 19 may extend above-grade in some embodiments such that the base extends above the ground surface 11. In other embodiments, the concrete 19 may extend to the ground surface 11 for a flush base, or below the ground surface 11 for a below-grade base.

Figure 17:
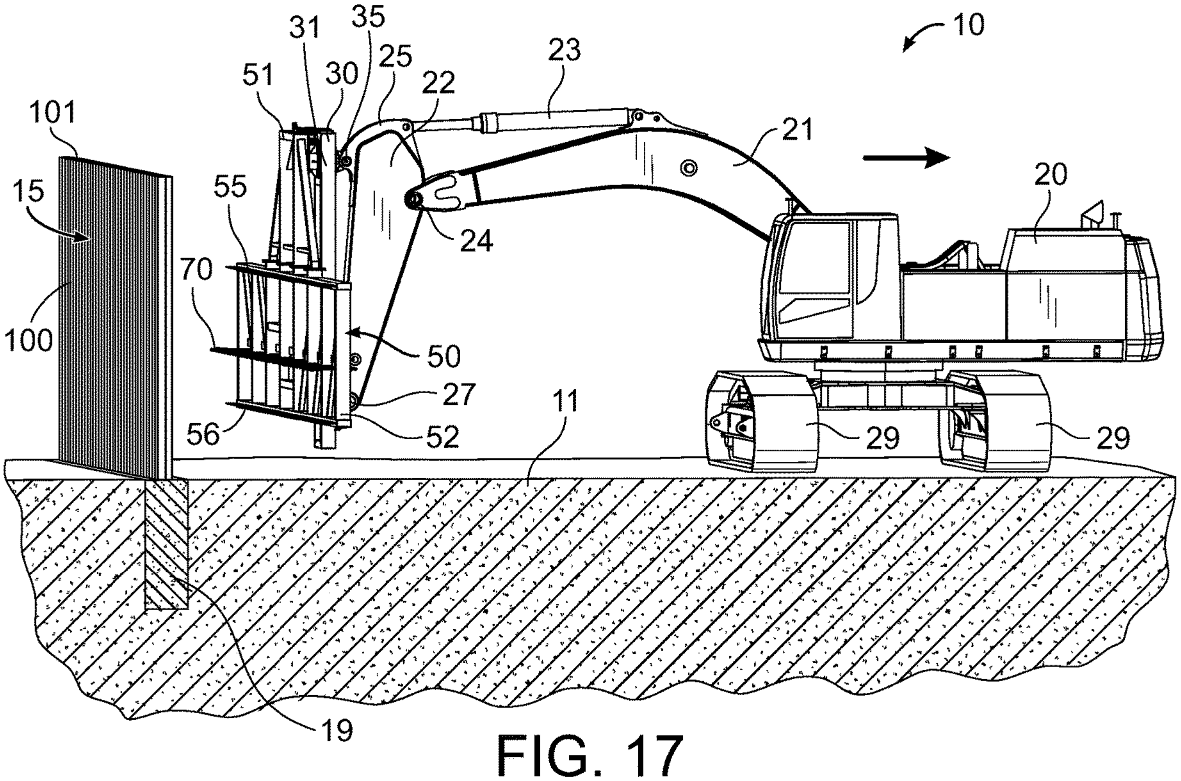
FIG. 17 is a side perspective view of a lifting frame being removed from an installed bollard wall by a vehicle of a bollard setting and installation system in accordance with an example embodiment.

Once the concrete 19 has been cured/set, the lifting frame 50 may be disconnected from the bollards 100. The clamps 70 may each be rotated back into their vertical, unlocked/released position. The vehicle 20 may then back away with the lifting frame 50 such as shown in FIG. 17. The bollard wall 15 is then free-standing and complete. The vehicle 20 may return to the setting frame 80 to retrieve additional bollards 100 to either form a separate bollard wall 15 or a continuation of the previously-installed bollard wall 15.

Figure 18:
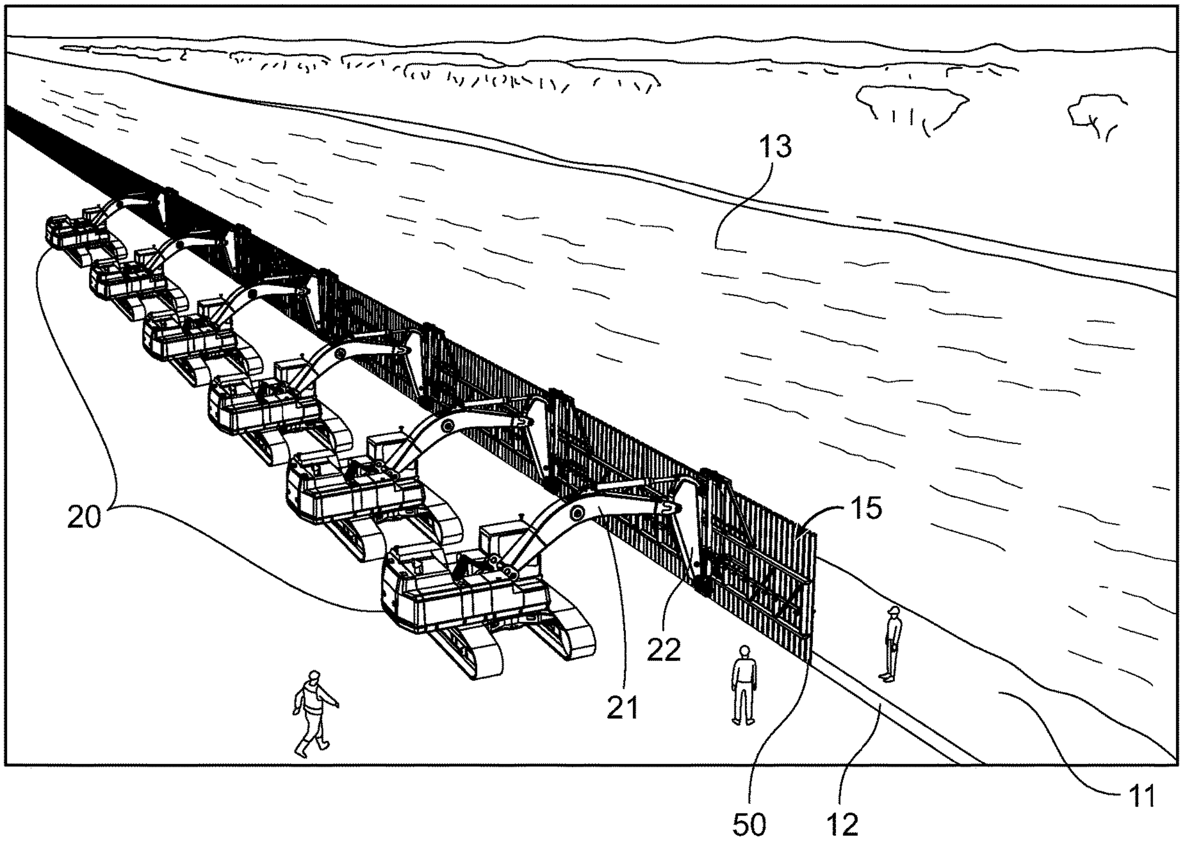
FIG. 18 is a perspective view illustrating multiple vehicles each having a lifting frame for installing an elongated bollard wall near a waterway of a bollard setting and installation system in accordance with an example embodiment.
Figure 19:
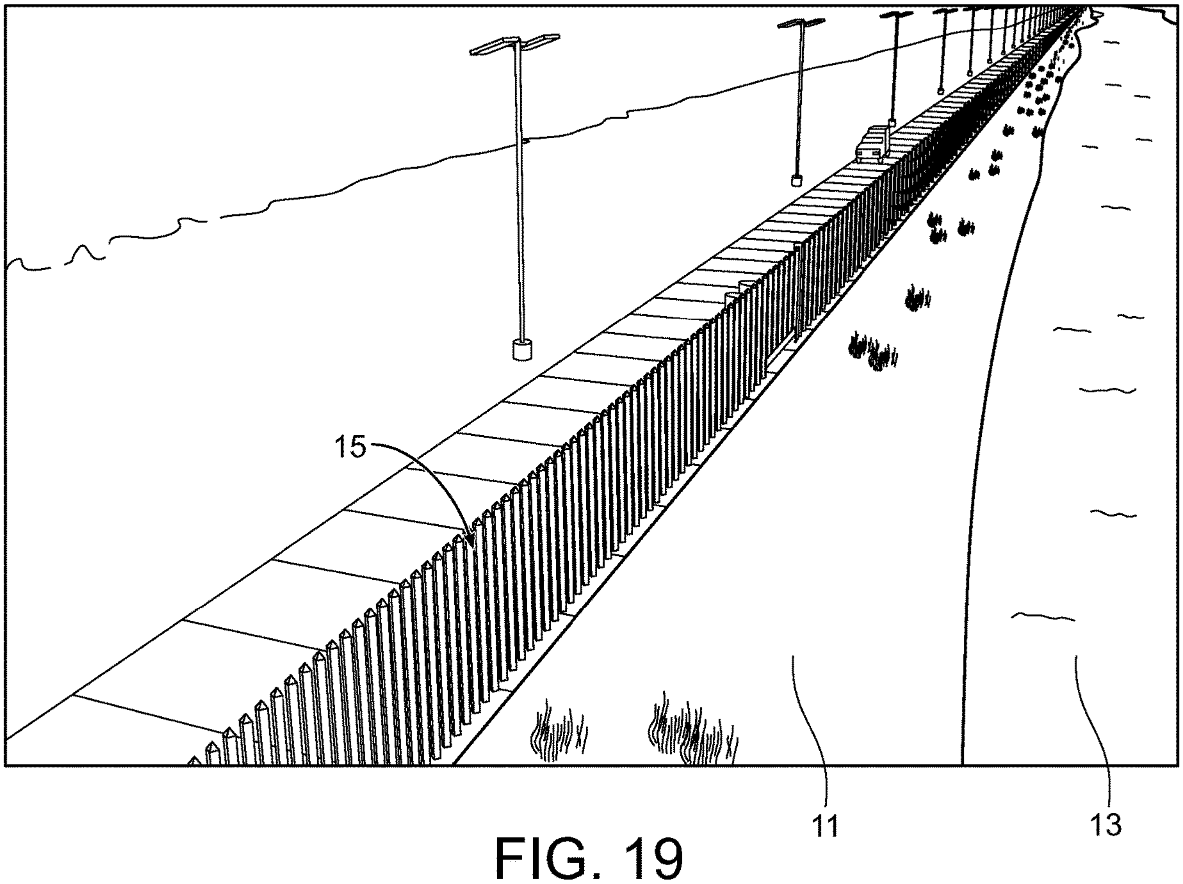
FIG. 19 is a perspective view of a completed bollard wall near a waterway of a bollard setting and installation system in accordance with an example embodiment.

Because the bollard wall 15 does not have an upper sheathing as is standard with such barriers, the bollard wall 15 may be installed much closer to a waterway 13 or flood plain than previously permitted. Any debris from flooding will pass through the gaps 103 in the bollards 100 rather than being caught on the sheathing and potentially knocking over the bollard wall 15. FIGS. 18 and 19 illustrate such a bollard wall 15 installed next to a waterway 13 such as a river.

In some embodiments, multiple vehicles 20 and lifting frames 50 may be utilized to install an elongated bollard wall 15 quickly and efficiently. FIG. 19 illustrates just such an embodiment in which multiple vehicles 20 are positioned in line, each holding bollards 100 within the ground opening 12 to form an elongated bollard wall 15. Using such a method, one can install a longer bollard wall 15 in much less time than would be achieved with only a single vehicle 20 going back and forth.

Unless otherwise defined, all technical and scientific terms used herein have the same meaning as commonly understood by one of ordinary skill in the art to which this invention belongs. Although methods and materials similar to or equivalent to those described herein can be used in the practice or testing of the bollard setting and installation system, suitable methods and materials are described above. All publications, patent applications, patents, and other references mentioned herein are incorporated by reference in their entirety to the extent allowed by applicable law and regulations. The bollard setting and installation system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A bollard lifting apparatus for lifting a plurality of bollards, wherein the plurality of bollards are spaced-apart with a plurality of gaps between the plurality of bollards, wherein each of the plurality of gaps is elongated and parallel to the plurality of bollards, comprising:

a lifting frame adapted to be connected to an arm of a vehicle; and a plurality of clamps rotatably connected to the lifting frame, wherein each of the plurality of clamps are rotatable between a released position and an engaged position;

wherein each of the plurality of clamps has a first projection and a second projection extending from a shaft, wherein the first projection extends in a direction opposite of the second projection;

wherein when the plurality of clamps are in the released position the first and second projections of the plurality of clamps are rotated to a position wherein the first and second projections are aligned in parallel with the plurality of gaps;

wherein when the plurality of clamps are in the released position the plurality of clamps are configured to allow the plurality of clamps to pass through the plurality of gaps between the plurality of bollards;

wherein when the plurality of clamps are in the engaged position the first and second projections of the plurality of clamps are rotated to a position wherein the first and second projections are transverse with respect to the plurality of gaps;

wherein when the plurality of clamps are in the engaged position the plurality of clamps are configured to prevent the plurality of clamps from passing through the plurality of gaps between the plurality of bollards;

wherein when the plurality of clamps are in the engaged position and extending through the plurality of gaps between the plurality of bollards, the plurality of bollards are removably connected to the lifting frame by the plurality of clamps and the vehicle is able to lift the plurality of bollards.

2. The bollard lifting apparatus of claim 1, wherein when the plurality of clamps are in the released position the first and second projections of each of the plurality of clamps are vertically orientated, and wherein when the plurality of clamps are in the engaged position the first and second projections of each of the plurality of clamps are horizontally orientated.

3. The bollard lifting apparatus of claim 1, wherein the released position is ninety degrees with respect to the engaged position.

4. The bollard lifting apparatus of claim 1, wherein each of the plurality of clamps is comprised of a T-shaped structure formed by a central rod, the first projection, and the second projection.

5. The bollard lifting apparatus of claim 1, wherein the first projection includes a first hooked end to engage one of the plurality of bollards and wherein the second projection includes a second hooked end to engage another of the plurality of bollards.

6. The bollard lifting apparatus of claim 1, wherein the second projection is heavier than the first projection.

7. The bollard lifting apparatus of claim 1, wherein the plurality of clamps are configured to be tightened against the plurality of bollards when in the engaged position.

8. The bollard lifting apparatus of claim 1, wherein the lifting frame is comprised of a plurality of bollard receivers, wherein each of the plurality of bollard receivers is adapted to receive one of the plurality of bollards.

9. The bollard lifting apparatus of claim 1, wherein the lifting frame is comprised of a plurality of upper bollard receivers and a plurality of lower bollard receivers.

10. The bollard lifting apparatus of claim 1, further comprising a coupler connected between the lifting frame and the arm, and an actuator connected to the lifting frame for rotating the lifting frame with respect to the arm about the coupler.

11. A method of installing a bollard wall using the bollard lifting apparatus of claim 1, comprising the steps of:

inserting the plurality of clamps in the released position through the plurality of gaps between the plurality of bollards;

moving each of the plurality of clamps into the engaged position to secure the plurality of bollards to the lifting frame;

lifting the lifting frame and the plurality of bollards;

moving the lifting frame and the plurality of bollards to a desired location; and lowering the plurality of bollards into an opening in a ground surface.

12. A bollard lifting apparatus for lifting a plurality of bollards, wherein the plurality of bollards are spaced-apart with a plurality of gaps between the plurality of bollards, wherein each of the plurality of gaps is elongated and parallel to the plurality of bollards, comprising:

a lifting frame adapted to be connected to an arm of a vehicle, wherein the lifting frame includes a plurality of bollard receivers, wherein each of the plurality of bollard receivers is adapted to receive one of the plurality of bollards; and a plurality of clamps rotatably connected to the lifting frame, wherein each of the plurality of clamps are rotatable between a released position and an engaged position;

wherein each of the plurality of clamps has a first projection and a second projection extending from a shaft, wherein the first projection extends in a direction opposite of the second projection;

wherein the first projection includes a first hooked end to engage one of the plurality of bollards and wherein the second projection includes a second hooked end to engage another of the plurality of bollards;

wherein the plurality of clamps are configured to be tightened against the plurality of bollards when in the engaged position;

wherein when the plurality of clamps are in the released position the first and second projections of the plurality of clamps are rotated to a position wherein the first and second projections are aligned in parallel with the plurality of gaps;

wherein when the plurality of clamps are in the released position the plurality of clamps are configured to allow the plurality of clamps to pass through the plurality of gaps between the plurality of bollards;

wherein when the plurality of clamps are in the engaged position the first and second projections of the plurality of clamps are rotated to a position wherein the first and second projections are transverse with respect to the plurality of gaps;

wherein when the plurality of clamps are in the engaged position the plurality of clamps are configured to prevent the plurality of clamps from passing through the plurality of gaps between the plurality of bollards;

wherein when the plurality of clamps are in the engaged position and extending through the plurality of gaps between the plurality of bollards, the plurality of bollards are removably connected to the lifting frame by the plurality of clamps and the vehicle is able to lift the plurality of bollards.

13. The bollard lifting apparatus of claim 12, wherein when the plurality of clamps are in the released position the first and second projections of each of the plurality of clamps are vertically orientated, and wherein when the first and second projections of each of the plurality of clamps are in the engaged position the plurality of clamps are horizontally orientated.

14. The bollard lifting apparatus of claim 12, wherein the released position is ninety degrees with respect to the engaged position.

15. The bollard lifting apparatus of claim 12, wherein each of the plurality of clamps is comprised of a T-shaped structure formed by a central rod, the first projection, and the second projection.

16. The bollard lifting apparatus of claim 12, wherein the second projection is heavier than the first projection.

17. The bollard lifting apparatus of claim 12, wherein the lifting frame is comprised of a plurality of upper bollard receivers and a plurality of lower bollard receivers.

18. The bollard lifting apparatus of claim 12, further comprising a coupler connected between the lifting frame and the arm, and an actuator connected to the lifting frame for rotating the lifting frame with respect to the arm about the coupler.

19. A method of installing a bollard wall using the bollard lifting apparatus of claim 12, comprising the steps of:

inserting the plurality of clamps in the released position through the plurality of gaps between the plurality of bollards;

moving each of the plurality of clamps into the engaged position to secure the plurality of bollards to the lifting frame;

lifting the lifting frame and the plurality of bollards;

moving the lifting frame and the plurality of bollards to a desired location; and lowering the plurality of bollards into an opening in a ground surface.

20. A bollard lifting apparatus for lifting a plurality of bollards, wherein the plurality of bollards are spaced-apart with a plurality of gaps between the plurality of bollards, wherein each of the plurality of gaps is elongated and parallel to the plurality of bollards, comprising:

a lifting frame adapted to be connected to an arm of a vehicle, wherein the lifting frame includes a plurality of bollard receivers, wherein each of the plurality of bollard receivers is adapted to receive one of the plurality of bollards; and a plurality of clamps rotatably connected to the lifting frame, wherein each of the plurality of clamps are rotatable between a released position and an engaged position;

wherein each of the plurality of clamps has a first projection and a second projection extending from a shaft, wherein the first projection extends in a direction opposite of the second projection;

wherein each of the plurality of clamps is comprised of a T-shaped structure formed by a central rod, the first projection, and the second projection;

wherein the first projection includes a first hooked end to engage one of the plurality of bollards and wherein the second projection includes a second hooked end to engage another of the plurality of bollards;

wherein the plurality of clamps are configured to be tightened against the plurality of bollards when in the engaged position;

wherein when the plurality of clamps are in the released position the first and second projections of the plurality of clamps are rotated to a position wherein the first and second projections are aligned in parallel with the plurality of gaps;

wherein when the plurality of clamps are in the released position the plurality of clamps are configured to allow the plurality of clamps to pass through the plurality of gaps between the plurality of bollards;

wherein when the plurality of clamps are in the engaged position the first and second projections of the plurality of clamps are rotated to a position wherein the first and second projections are transverse with respect to the plurality of gaps;

wherein when the plurality of clamps are in the engaged position the plurality of clamps are configured to prevent the plurality of clamps from passing through the plurality of gaps between the plurality of bollards;

wherein when the plurality of clamps are in the engaged position and extending through the plurality of gaps between the plurality of bollards, the plurality of bollards are removably connected to the lifting frame by the plurality of clamps and the vehicle is able to lift the plurality of bollards;

wherein the released position is ninety degrees with respect to the engaged position.

* * * * *